United States Patent
Nagaya et al.

(10) Patent No.: US 6,741,977 B1
(45) Date of Patent: May 25, 2004

(54) IMAGE RECORDING/REPRODUCING APPARATUS IN MONITOR SYSTEM

(75) Inventors: Shigeki Nagaya, Chofu (JP); Takafumi Miyatake, Hachioji (JP); Takehiro Fujita, Mitaka (JP); Akio Nagasaka, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/493,240

(22) Filed: Jan. 28, 2000

(30) Foreign Application Priority Data

Jan. 29, 1999 (JP) .......................................... 11-021241

(51) Int. Cl.[7] .............................................. G06F 17/30
(52) U.S. Cl. .................. 707/1; 707/2; 707/3; 348/135; 348/143; 348/155
(58) Field of Search ................................. 707/500, 501, 707/502, 1, 2, 3, 4, 5; 709/217, 218, 219; 348/135, 143, 155; 382/100, 173, 232

(56) References Cited

U.S. PATENT DOCUMENTS

| | | | |
|---|---|---|---|
| 5,229,850 A | | 7/1993 | Toyoshima |
| 5,809,202 A | * | 9/1998 | Gotoh et al. ................. 386/69 |
| 5,969,755 A | * | 10/1999 | Courtney .................... 348/143 |
| 6,003,030 A | * | 12/1999 | Kenner et al. ................ 707/10 |
| 6,006,265 A | * | 12/1999 | Rangan et al. .............. 709/226 |
| 6,360,234 B2 | * | 3/2002 | Jain et al. ................ 707/500.1 |
| 6,483,532 B1 | * | 11/2002 | Girod ..................... 348/14.12 |

FOREIGN PATENT DOCUMENTS

GB    2271460    4/1994
WO    9707486    2/1997

* cited by examiner

Primary Examiner—Shahid Alam
Assistant Examiner—Isaac Woo
(74) Attorney, Agent, or Firm—Antonelli, Terry, Stout & Kraus, LLP

(57) ABSTRACT

For image recording/reproduction in a monitoring system, a monitoring image signal as inputted is converted into a plurality of time-serial digitized monitoring image frames to be stored temporarily in a first storage area. From the plurality of digitized monitoring image frames stored in the first storage area, a plurality of monitoring image frames relevant to at least one type of concerned event for monitoring are extracted to be stored in a second storage area. A monitored event database having a data structure comprised of elements each containing information concerning a storing location of relevant monitoring image frame in the second storage area and information concerning attributes of the relevant monitoring image frame for each of the monitoring image frames stored in the second storage area is generated to be stored in a third storage area. In response to a perusal request issued by user by using a WEB browser and sent via a network, the monitored event database is searched for acquiring a storing location of plural monitoring image frames relevant to the perusal request in the second storage area to thereby select from the second storage area a plurality of monitoring image frames relevant to the perusal request. The selected plural monitoring image frames are converted into HTML data to be sent to a display device connected via a network to be displayed on a display device in a two-dimensional layout or in the form of time-serial animation.

21 Claims, 20 Drawing Sheets

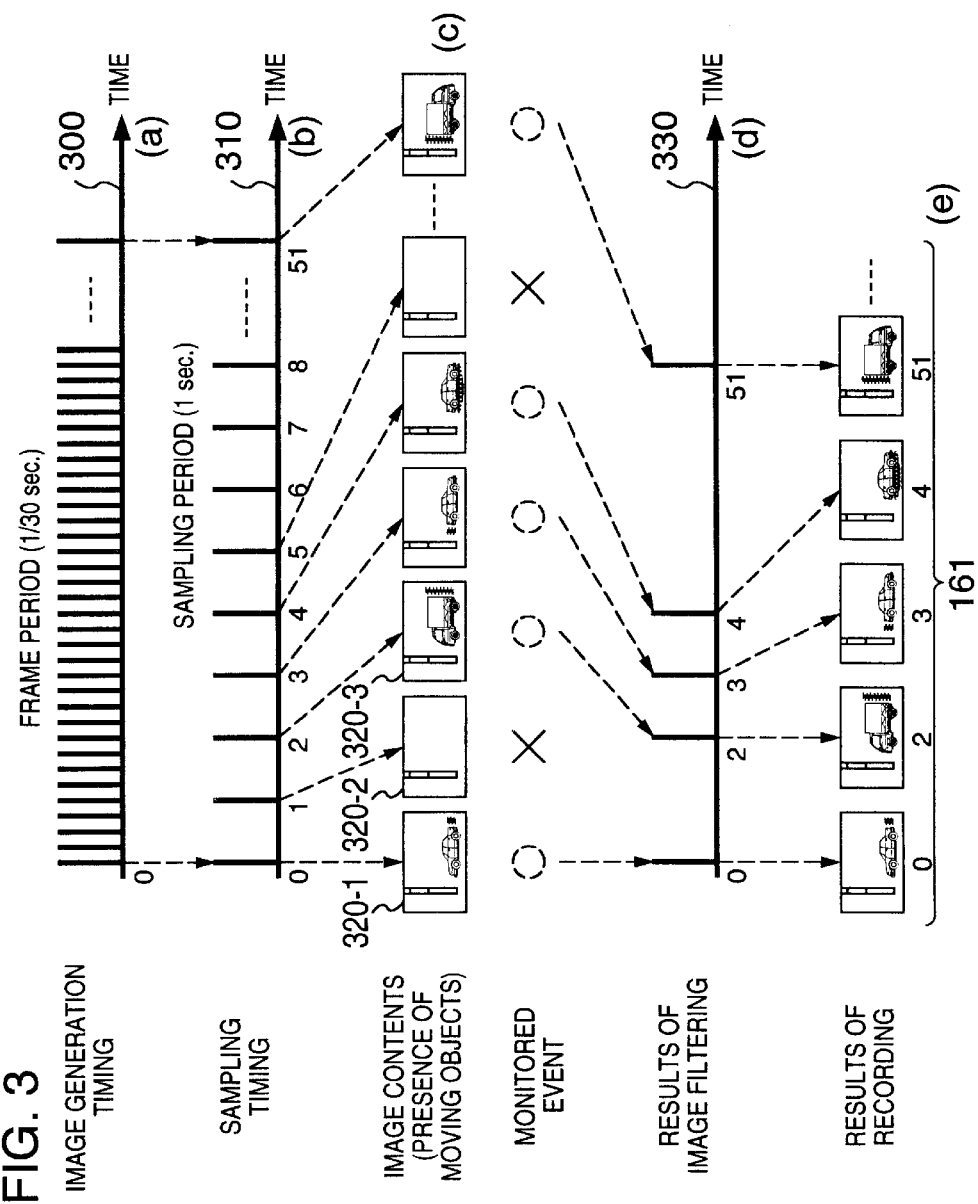

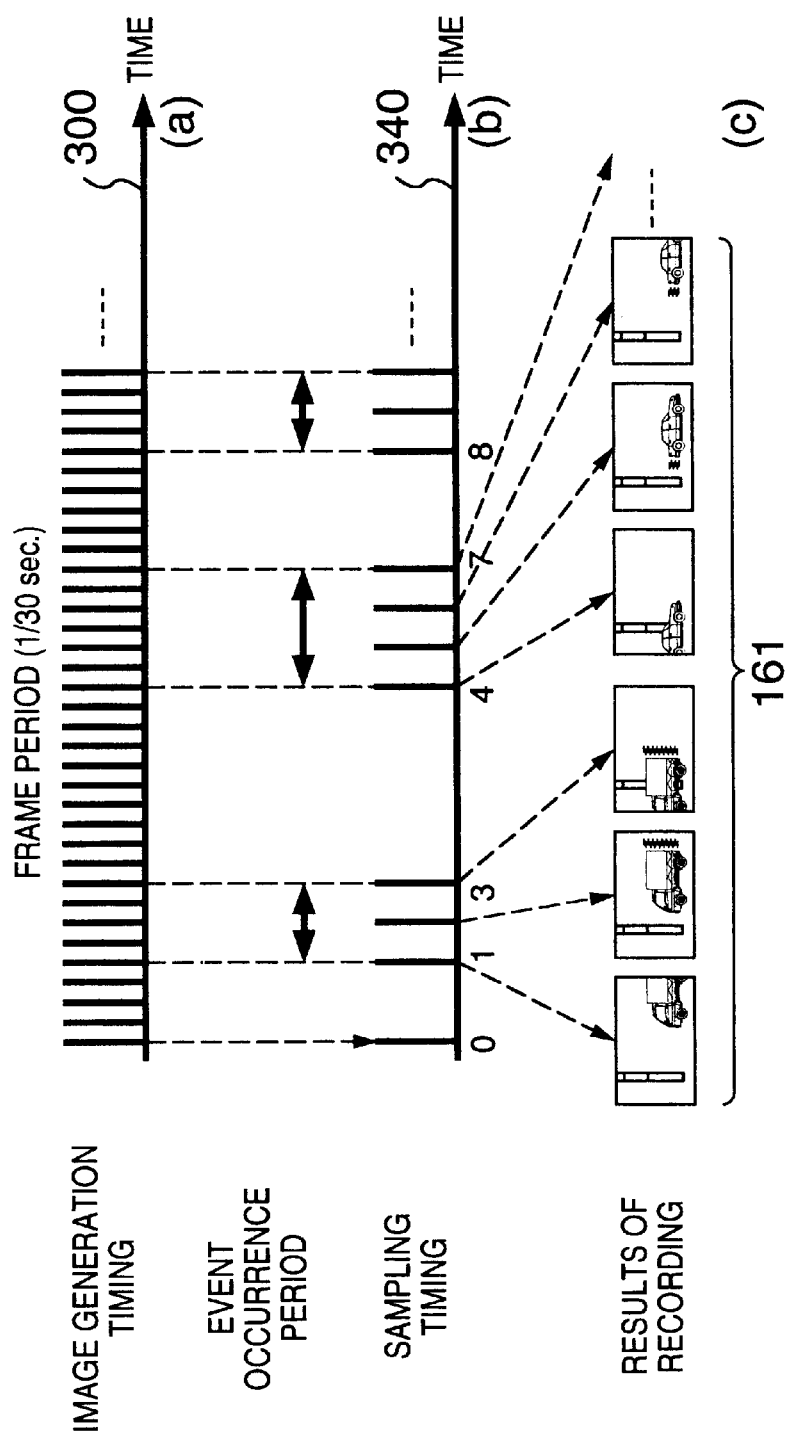

FIG. 16B

HTML OF FRAME "Digest"

```
/1000
<HTML>
.....
  <TABLE>
              /1030
    <TR>
    <TD>19:00:17-19:00:49</TD>
    <TD>19:01:04-19:01:08</TD>
    </TR>
                                      /1040
    <TR>
    <TD>
      <A HREF= "Anime.asp?sJumpKey=2581-2611" TARGET= "Anime">   1041
      <IMG SRC= "/Snapshots/19981127-190032-00.jpg" >
      </A>                                            1042
    </TD>

<TD>
      <A HREF= "Anime.asp?sJumpKey=2612-2616" TARGET= "Anime">
      <IMG SRC= "/Snapshots/19981127-190106-07.jpg" >
      </A>
    </TD>
    </TR>

</TABLE>
  .....
<HTML>
```

FIG. 16C

```
1041                                  1051
  <A HREF= "Anime.asp?sJumpKey=2581-2611" TARGET= "Anime">

<IMG SRC= "/Snapshots/19981127-190032-00.jpg">
1042                       1052
```

FIG. 19B

HTML OF FRAME "TimeTree"

```
<HTML>
 ....
<DIV ID="TTreeKey¥1¥98/11/26d" STYLE="DISPLAY:None">
"+"<A HREF="Digest.asp?sDitgestKey=CAMERA-1¥98NOV26" TARGET="Digest"> NOV-26</A>
 ....                                                          ~1310
<DIV ID="TTreeKey¥1¥98/11/26d" STYLE="DISPLAY:None" >
"++"<A HREF="Digest.asp?sDitgestKey=CAMERA-1¥98NOV26¥10" TARGET="Digest"> 10: </A>
 ....                                                              ~1320
  <DIV ID="***********">
   ....
  </DIV>
</DIV>
</HTML>
```

1300

IMAGE RECORDING/REPRODUCING APPARATUS IN MONITOR SYSTEM

CROSS-REFERENCE TO RELATED APPLICATION

This application is related to U.S. application Ser. No. 08/601,951 filed Feb. 15, 1996 now matured to U.S. Pat. No. 5,721,692, contents of which are incorporated herein by reference.

BACKGROUND OF THE INVENTION

The present invention relates generally to an image recording/playback apparatus which is designed for use in a system for monitoring various events taking place in a place concerned by making use of movie techniques. More particularly, the present invention is concerned with an improvement of the image recording/playback apparatus which makes it possible to survey and/or retrieve a monitoring picture or image recorded over an extended period within a short time on the order of one several-tenth of the recording period. Further, the present invention is concerned with a image recording/playback method and a recording medium which stores the method in the form of a program executable with a computer.

In a place such as supermarket, convenience store, elevator hall or the like which is frequented by a large number of persons and which is difficult to be surveyed by a person in charge of management or watching, a monitoring camera is installed for the purpose of preventing accidents and/or crimes in advance. In this conjunction, the monitoring system for monitoring the places such as mentioned above by viewing the moving images or pictures taken by such monitoring camera can generally be classified into two types, i.e., a system which necessitates a constant survey of collected images picked up by the monitoring cameras by a person at a center station (hereinafter referred to as the online-type monitoring system) and a system in which pictures or images taken by the monitoring camera are stored accumulatively for allowing survey and inspection thereof later as occasion requires, e.g. upon commitment of offense or crime (hereinafter this type of monitoring system will be referred to as a storage-type monitoring system). The storage-type monitoring system involves scarcely personnel expenses when compared with the online-type monitoring system. For this reason, the former is adopted widely in practical applications. At this juncture, it is noted that in the storage-type monitoring system, a time-lapse video recorder is primarily employed for storing and playback the pictures or images as picked up by the monitoring camera.

With the time-lapse video recorder, such a video recorder is meant which is modified on the basis of a conventional video recorder such that the time interval for recording the images at a rate of thirty frames per second is increased to an interval on the order of several frames per second for recording only sparsely. Thus, with the time-lapse video recorder based on the conventional video recorder, it is possible to perform the recording over a period of about 180 hours (about eight days) by recording at the rate of one frame per second by using a tape medium capable of recording over 120 minutes with the conventional video recorder. Of course, by increasing the frame interval, recording can be performed over a further extended period which will however be accompanied with dropout of image of some object under monitoring, to a disadvantage. For this reason, the recording interval which exceeds one second or so is not adopted in practical applications. Further, it is conceivable to use a tape medium which can ensure a recording duration which exceeds 120 minutes or so. However, in consideration of durability (or possibility of breakage) of the tape medium, the tape which allows recording over 120 minutes or so is usually employed. Such being the circumstances, the longest recording time duration of the time-lapse video recorder based on the conventional video recorder is approximately 180 hours.

Image recording is performed starting from the leading end of the tape toward the trailing end thereof. Upon reaching the trailing end of the tape in the image recording operation, tape rewinding operation is automatically put into effect, whereon overwriting operation is performed, starting again from the leading end of the tape. In this manner, a series of images can be stored ordinarily over a time span of 180 hours or so at maximum. For perusing or surveying the images as recorded, substantially same method as that for the conventional video recorder can be resorted to. However, when the images recorded by the time-lapse video recorder based on the video recorder are to be reproduced straightforwardly in a same manner as the picture recorded by the conventional video recorder, the playback speed may amount to be thirtyfold.

Accordingly, the time-lapse video recorder is ordinarily provided with a mechanism for allowing the recorded images to be reproduced at a rate of several frames per second.

Among the time-lapse video recorders, there has been developed such a recorder in which a digital recording on a hard disk is adopted. With the time-lapse video recorder which is based on the VHS video recorder, the recording head may be damaged because recording/stop operations are mechanically repeated. Besides, the tape medium is likely to become degraded, incurring deterioration of quality of the reproduced images. These problems can certainly be solved by the digital recorder mentioned above. Parenthetically, the digital recorder is generally termed the digital time-lapse video recorder distinctively from the time-lapse video recorder based on the conventional VHS video recorder.

As will now be appreciated from the foregoing, monitoring images can be stored over an extended time period with the time-lapse video recorder. However, the time-lapse video recorder suffers serious problems with regard to the image reproduction for the survey or perusal. Firstly, it has to be pointed out that several times as long as the recording time of the recording medium (120 minutes in the case of the video tape) will be taken for observing thoroughly all the images or pictures recorded during the extended period of for 180 hours. Secondly, effectiveness of search and/or perusing (or surveying) operations is extremely poor because of disordered states of the objects concerned with images of significance and insignificance being recorded concurrently and alternately. In the present state of the art, reproduction is performed simply from the leading end of the tape while observing the images only rumblingly, which will often result in failure to notice the image of interest or concern, to a great disadvantage.

As is apparent from the above, the perusal of the images recorded accumulatively with the time-lapse video recorder imposes a great burden on the user because of necessity for concentrative observation of the images over a much extended time period.

At this juncture, it should be added that as an approach for solving the problems mentioned above, there has already been proposed such a monitoring system in which an infrared sensor such as a man-sensor is combined with the time-lapse video recorder. However, such system suffers many drawbacks. Firstly, with the time-lapse video recorder based on the VHS video recorder, mechanical portion for effectuating the recording/stop operations will be damaged at a relatively high failure rate because of frequent on/off operations. Secondly, reliability can not be ensured in respect to the effective coverage range of the sensor and the sensitivity thereof. Thirdly, high cost will be involved in retrofitting the monitoring system. For these reasons, combination of the sensor with the time-lapse video recorder is seldom adopted in the practical applications, leaving the aforementioned problems unsolved.

SUMMARY OF THE INVENTION

The fundamental problem of the conventional time elapse video recorder can be found in that the image data as inputted to the recorder are simply recorded on a time serial basis without performing any classification of the data. In this conjunction, let's suppose a case where a person monitors a certain place as to occurrence of some event. In that case, he or she will take notes of the events such as, for example, coming-in/out of persons, positional changes of equipment or the like for classification and orderly arrangement with a view to facilitating the search or retrieval of the events as recorded. Further, upon perusal or survey, only the images of concern (e.g. images showing features of incomers or intruders, destruction of equipment or facilities, theft of something valuable) will first be checked briefly and thereafter examined in detail without haste. Contrivance of this sort will become more important as the time taken for the monitoring increases.

It goes without saying that even in the monitoring system in which the time-lapse video recorder is employed as the image recording/playback apparatus, capability of orderly arrangement, classification and selection of the images which would be performed if the images are handled by a person, as mentioned above, can contribute considerably to reduction of the time taken for the search while alleviating significantly the burden imposed mentally on the user.

As will be understood from the foregoing, the conventional image recording/playback apparatus typified by the time-lapse video recorder suffers drawbacks in respect to the storage of images with classification and orderly arrangement and the surveying facility which allows the user to search the image of concern without any appreciable difficulty.

In the light of the state of the art described above, it is an object of the present invention to provide an image recording/playback apparatus for a monitoring system which apparatus can perform recording and reproduction of monitoring images very effectively and conveniently for the user.

More particularly, it is an object of the present invention to provide an image recording apparatus, a monitoring system and a monitoring method which can detect various events occurring in a place subjected to the monitoring and store the images with classification and orderly arrangement in dependence on the types or species of the events while presenting an interface capable of reducing significantly the time taken for the user to survey or peruse the images.

It is also an object of the present invention to provide a recording medium which stores the monitoring method in the form of a program or programs executable by a computer.

In view of the above and other objects which will become apparent as the description proceeds, there is provided according to an aspect of the present invention an image recording/playback apparatus for a monitoring system which apparatus includes a unit for inputting and digitizing images on a time-serial basis, an input image displaying unit for displaying the image being inputted currently, a monitored event detecting unit for detecting a monitored event from the image as inputted, an image recording decision unit for deciding whether the image as inputted is to be stored or not on the basis of the event as detected, an image storing unit for storing an image which is decided to be recorded by the image recording decision unit, a monitored event storing unit for recording a storage location of the image as stored and the monitored event information as detected, an image selecting/disposing unit for searching the event information which meets user's perusal demand and selecting the images for perusal to thereby lay out the event(s) together with the information thereof, and a monitoring information display unit for displaying one or a plurality of the images and/or the event information as laid out.

As the recording medium for the image storing unit and the monitored event storing unit mentioned above, a hard disk, a DVD-RAM or a random access memory of flash-memory type may be employed.

Further, the monitored event detecting unit mentioned above may be implemented by resorting to a scheme which is disclosed, for example, in the U.S. Pat. No. 5,721,692 titled "MOVING OBJECT DETECTING APPARATUS". According to this method, presence/absence of change of the background structure, presence/absence of change of illumination, presence/absence of a moving object and the like are detected, respectively, as monitored events on the basis of difference degree between the images inputted upon sampling and an image recorded in the past. Further, a region of flesh color is detected. Additionally, decision is made as to whether or not a face candidate area or field exists in the scene in which a moving object is found. On the basis of the results of the detection and the decision mentioned above, monitored event such as "presence of a person whose face is presented most closely to the monitoring camera" is detected.

In a preferred mode for carrying out the invention, the aforementioned image recording decision unit may be so designed as to decide whether or not the recording is to be performed in consideration of the latest monitored event, species/histories of the events already detected, difference between the time point at which the immediately preceding image was recorded and the current time point, residual capacities of the media employed in the various storage units, minimum time duration for storage as designated by the user.

Further, the monitored event storing means mentioned previously may preferably be so designed as to store characteristic quantities concerning the monitored event(s) such as the location where the image is to be stored in the image storing unit, date/time of occurrence and termination of the event, position of the event within the image frame, a camera identifier (or identifier of the place being monitored) in the case where decision is made that image recording is to be performed for the event(s).

In another preferred mode for carrying out the present invention, the image selecting/disposing unit may be so designed as to search or retrieve the monitored event information in accordance with the user's survey request such as, for example, "a list of detected face images", "a list of events occurred within given one hour", "display in animation the images recorded for a given monitored event", "a list of changes of installations at a place being monitored", "distribution of monitored events in one day" and the like, to thereby generate a screen image for a display unit by selectively disposing the appropriate images in a manner easy for viewing by the user. Parenthetically, rules/ algorithms concerning the objects for search or retrieval and the image/layouts for each of the screen images may previously be incorporated as firmware in the apparatus.

In yet another preferred mode for carrying out the present invention, there may be provided additionally a unit for establishing synchronism among a plurality of images being displayed or monitored event information in accordance with surveying operation performed by the user.

By virtue of the arrangement mentioned above, an interface which enables display of plural images in association with one another can be realized, whereby the monitored event information as well as the images can be presented to the user very efficiently and multilaterally.

The above and other objects, features and attendant advantages of the present invention will more easily be understood by reading the following description of the preferred embodiments thereof taken, only by way of example, in conjunction with the accompanying drawings, being appreciated that many modifications and variations of the present invention are possible in the light of the techniques disclosed herein.

DESCRIPTION OF THE PREFERRED EMBODIMENTS

In the course of the description which follows, reference is made to the drawings, in which:

FIG. 3 is a view for illustrating a method of sampling basic frame images in a system for recording images relevant to monitored events as detected according to an embodiment of the present invention;

FIG. 4 is a view for illustrating a method of sampling frame images on the basis of presence/absence of a monitored event in the system for recording images relevant to monitored events as detected according to the present invention;

FIGS. 16A, 16B and 16C are views for illustrating a scheme for realizing by HTML a monitoring picture display as presented on a user interface by a WEB browser according to an embodiment of the present invention;

FIGS. 19A and 19B are views for illustrating a method of dynamically changing over a time tree display screen image to a list display screen image according to an embodiment of the present invention.

DESCRIPTION OF THE EMBODIMENTS

Figure 1:
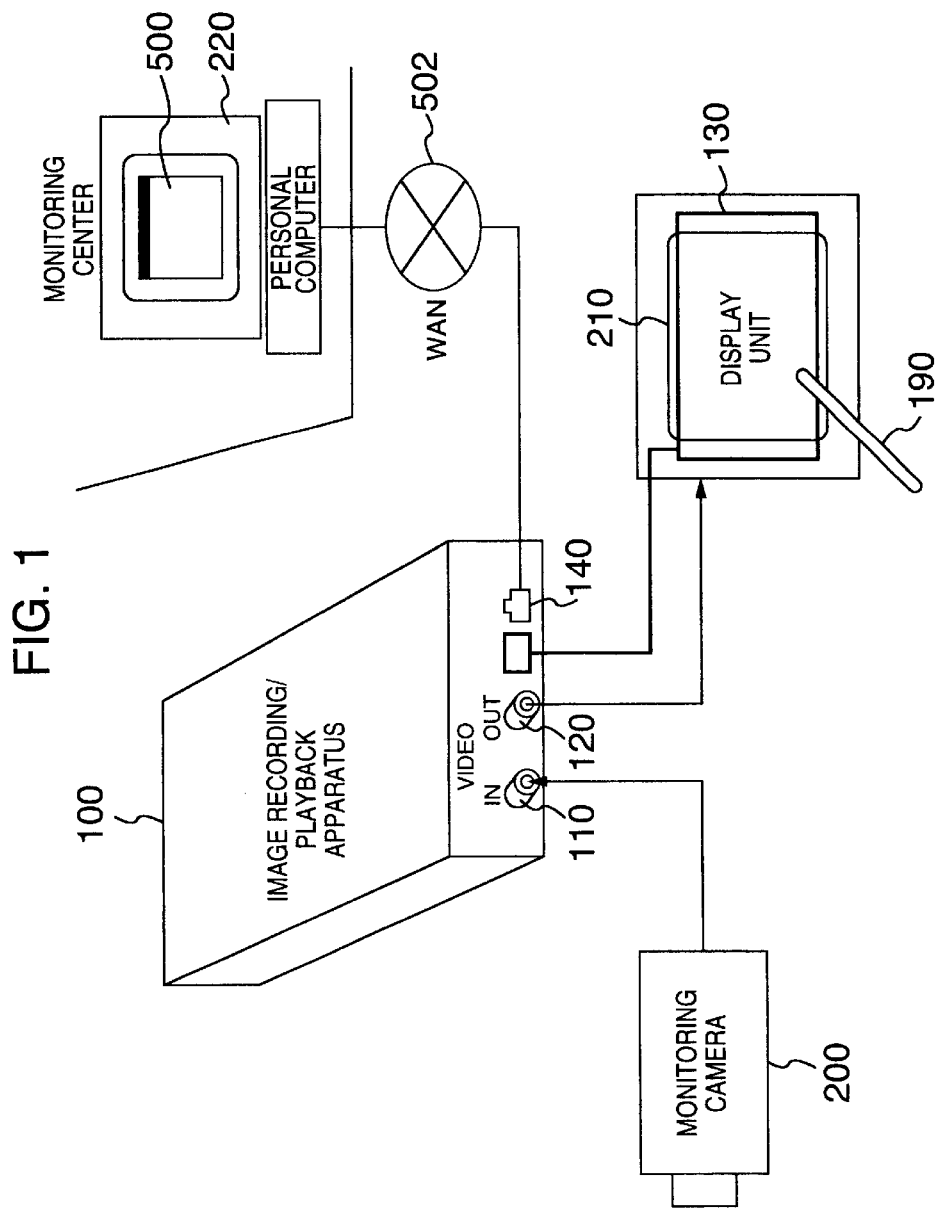
FIG. 1 is a schematic block diagram showing, by way of example, a system configuration of a monitoring system to which an image recording/playback apparatus according to the present invention can find application.

The present invention will be described in detail in conjunction with what is presently considered as preferred or typical embodiments thereof by reference to the drawings. In the following description, like reference characters designate like or corresponding parts throughout the several views. In the following description, like reference characters designate like or corresponding parts throughout the several views. Also in the following description, it is to be understood that such terms as "left", "right", "top", "bottom" and the like are words of convenience and are not to be construed as limiting terms.

FIG. 1 is a schematic block diagram showing, by way of example, a system configuration of a monitoring system to which an image recording/playback apparatus according to an exemplary embodiment of the present invention can find application. Referring to the figure, an image signal issued from a monitoring camera 200 is inputted to an image recording/playback apparatus 100 through an video input terminal 110 to be recorded as a digital image signal. The digital image signal as recorded can be reproduced and outputted through a video output terminal 120 to be displayed on a display device 210 in the form of an analogue image. Further, the digital image recorded can be sent to a personal computer 220 installed at a monitoring center from a LAN (Local Area Network) terminal 140 of the image recording/playback apparatus 100 via a wide area network (WAN) 502. To this end, a telephone line or the like can be used. For issuing commands to control the image recording/playback apparatus 100, there are provided a touch panel 130 and a pointing device 190.

As will be appreciated from the above, a conventional or existing analogue-type monitoring camera and a display device can be used without any substantial modification as the monitoring devices to be connected to the image recording/playback apparatus 100 according to the present invention. At this juncture, it should be added that the capability of transmitting the monitoring images to a far-distant place or places via a network is a function which can not be found in the conventional time-lapse video recorder.

Figure 2:
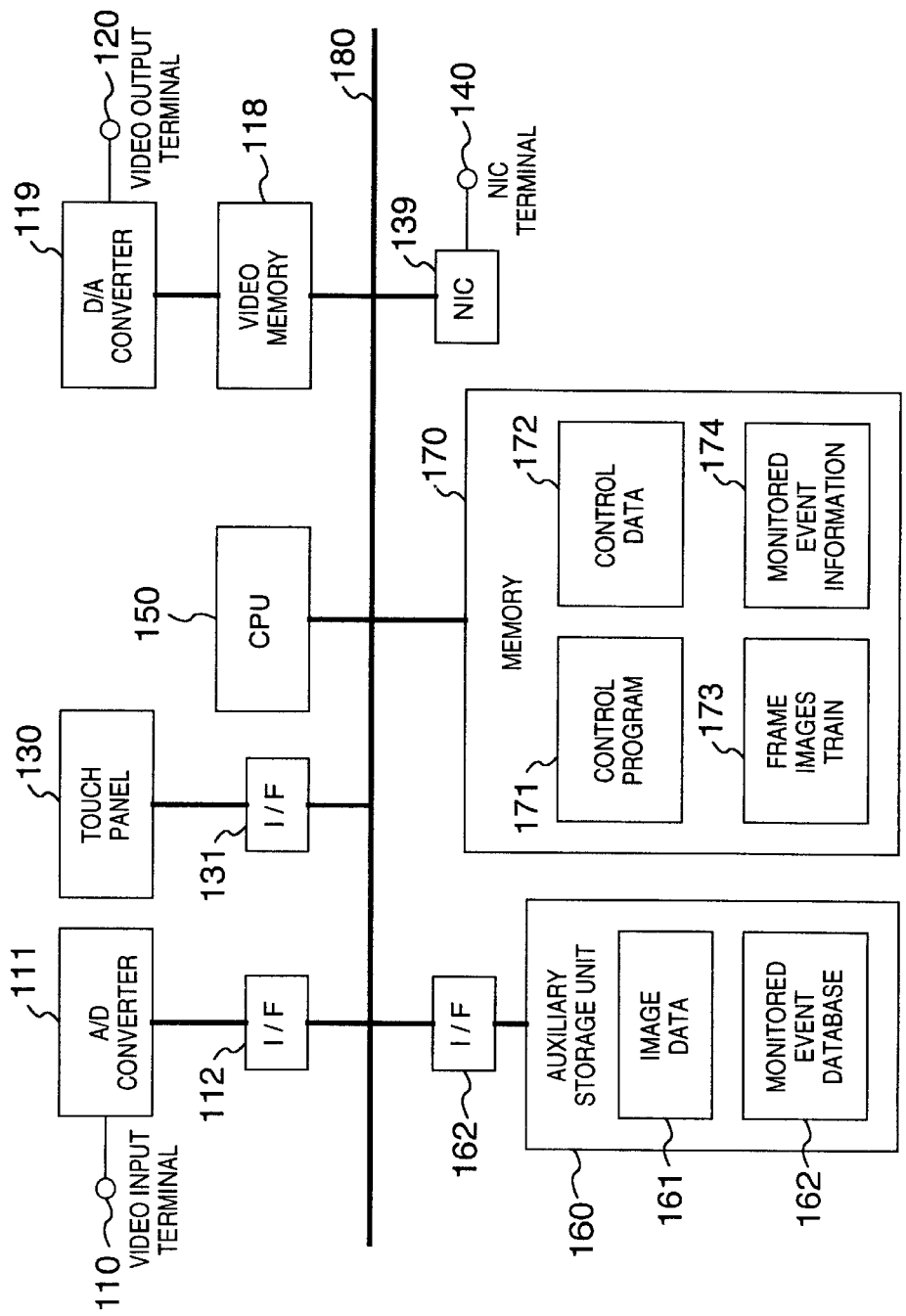
FIG. 2 is a schematic block diagram showing, by way of example, a system configuration of an image recording/playback apparatus according to an embodiment of the present invention.

FIG. 2 is a schematic block diagram showing, by way of example, a system configuration of the image recording/playback apparatus according to an exemplary embodiment of the present invention. Basically, the image recording/playback apparatus is implemented in a structure which is similar to the system configuration of digital computers employed generally at present.

Referring to FIG. 2, reference numeral 111 denotes an analogue-to-digital (A/D) converter for converting the analogue image signal outputted from the monitoring camera into a digital image signal. The digital image signal resulting from the A/D conversion is stored in a memory 170 via an interface 112. In the case where the image signal outputted from the monitoring camera 200 is to be displayed intactly on the display device 210, the image signal is simultaneously stored in a video memory 118. Incidentally, it should be mentioned that the A/D converter 111 can be spared in the case where the digital image signal is inputted from the video input terminal 110.

The video memory 118 is arranged to store therein the image to be displayed on the display device 210 as digital data. Reference numeral 119 denotes a sort of D/A converter generally known as the RAMDAC (RAM DigitaltoIAnalogue Converter) which is so arranged as to read sequentially the data written in the video memory 118 in conformance with a scanning line speed for thereby depicting a relevant image on the display device 210. Accordingly, every time the data stored in the video memory 118 is updated, the contents thereof are immediately reflected in the contents of image generated on the display device 210. Needless to say, the display device 210 is a device serving for displaying the image. In this conjunction, a small-type CRT (Cathode Ray Tube), a plasma display, a liquid-crystalItype display device or the like may be employed as the display device 210.

By repeating the image fetching operation such as mentioned above at a frequency on the order of thirty times per second, there can be generated a display of a continuously moving picture on the display device.

Reference numeral 160 denotes an auxiliary storage unit which may be constituted by a large capacity storage such as a hard disk or the like for recording thereon the digital data semipermanently. The auxiliary storage unit 160 may be so implemented as to be removably mounted on the main body of the image recording/playback apparatus as a whole such as exemplified by a PCMCIA (Personal Computer Memory Card International Association)—type hard disk card or alternatively the auxiliary storage unit 160 may be constituted by such type of recording unit in which only the recording medium can removably mounted or inserted such as exemplified by a DVD-RAM (Digital Video Disk Random Access Memory), a flash memory or the like.

Reference numeral 150 designates a CPU (Central Processing Unit) which is adapted to execute a software program or programs for realizing various functions such as detection of monitored events (also referred to as the events concerned for monitoring or concerned events), controls for image recording, selection/layout of images to be displayed and others which will be described hereinafter in accordance with the teachings of the present invention. The software program is resident on the memory 170 in which data required for execution of the program may also be stored as occasion requires.

Reference numeral 139 designates an NIC (Network Interface Card) which is designed for transmitting recorded images and monitored event information via a network.

Commands issued by the user is supplied to the CPU 150 from a touch panel 130 via an interface 131 to be processed appropriately by the CPU 150. At this juncture, it should however be added that in place of the touch panel 130, an infrared communication system may be adopted for allowing the information input operation to be performed with the aid of a remote controller.

Reference numeral 180 designates a data bus for interconnecting the units or devices mentioned above.

Now, description will be directed to operation of the image recording/playback apparatus implemented in the system configuration described above.

Firstly, description will turn to the operations involved in recording of the monitoring images (i.e., images concerned for monitoring).

The recording operation of the image recording/playback apparatus is controlled by a control program 171 which is stored in the memory 170 and which is executed by the CPU 150. At first, the image signal of a predetermined time duration is fetched through the video input terminal 110 to be temporarily stored in the memory 170 as a train of digital frame images. When the image signal as fetched is to be displayed intactly or straightforwardly on the display device 210, the image signal is transferred sequentially to the video memory 118 at the same time as the storage in the memory 170, to be thereby fed to the display device 210 via the A/D converter 119 and the video output terminal 120 for display as the input image. Subsequently, from the frame image train stored temporarily in the memory 170, monitored event information 174 is detected to be stored in the memory 170. On the basis of the monitored event information 174 and control data 172, only the images which are to be recorded are selectively determined. Finally, the selected images and the relevant monitored event information are stored in the auxiliary storage unit 160 as the additional image data for the image data 161 and the additional event information for the monitored event database 162, respectively. In that case, identifiers (ID) of the events, relevant places and times, characteristic quantities representing the events, and the results of arithmetic operations involved in the selective or discriminative decision of the event are stored on an imageby-image basis so that the images can be retrieved or searched and/or discriminatively selected on the basis of the types of monitored events and the characteristic quantities.

Next, description will be directed to operation of the image recording/playback apparatus when the monitoring images are surveyed or perused by the user. Operations involved in the survey or perusal (hereinafter referred to simply as the perusal) are executed by the CPU 150 under the control of the control program 171 which is stored in the memory 170, as in the case of the recording operation. At first, in response to the perusal (survey) request issued by the user and inputted through the medium of the touch panel 130, the monitored event information relevant to the user's request is transferred to the memory 170 from the monitored event database stored in the auxiliary storage unit 160. In that case, internal records contained in the monitored event information are read out to thereby delete those internal records which do not coincide with the perusal request from the memory 170. Subsequently, the selected internal records contained in the monitored event information are read to thereby acquire a path name of the image which corresponds to the monitored event relevant to the user's perusal request, whereon the relevant image is transferred to the memory 170 from the auxiliary storage unit 160 by making use of the path name. Subsequently, the monitored event information and the image in the memory 170 are laid out in an array easy for observation by the user and sent to the video memory 118. The monitored event information and the image data transferred to the video memory 118 are displayed intactly on the display device 210 as the information indicative of a result of the monitoring operation. The operation or processing procedure described above can be executed repetitively a number of times in response to the input command of the user.

In general, in the time-lapse video recorder, sampling interval for recording the images can arbitrarily be set. Needless to say, the image recording over an extended time period can be carried out by increasing the sampling interval. However, when the sampling interval is simply increased to an excessive extent, there may arise such recording omission that an object transversing the image frame picked up by the camera is omitted from recording, giving rise to a problem that the intrinsic purpose of the monitoring can not be achieved. Thus, according to the teachings of the present invention, there is provided a system or scheme which allows the image recording to be carried out over an extended time period without incurring the recording omission, as will be elucidated below.

FIG. 3, 4 and 5 are views for illustrating a system or scheme for recording images relevant to monitored events as detected.

More specifically, FIG. 3 is a view for illustrating a recording scheme in which a simple time-lapse image recording is combined with filtering effectuated in response to monitored events.

Referring to FIG. 3, reference numeral 300 designates a timing chart for illustrating a timing at which a video signal is generated periodically. Thirty frames are generated per one second in accordance with the NTSC Standards. By contrast, according to the present invention, thinning-out of the frames on a time base is realized by fetching the images periodically at a predetermined or designated sampling interval.

In FIG. 3, reference numeral 310 designates a timing chart for the sampling operation. In the case of the illustrated example, the frames are thinned out to one thirtieth so that one frame is fetched every one second.

Reference numeral 320 designates generally contents of the images at the sampling time points, respectively. When the monitoring camera is fixed stationarily with substantially no changes taking place with regard to the intruding object and the background (frame 320-2), i.e., so long as no monitored event occurs, images of an input image train remain essentially unchanged. Accordingly, when decision is made such that no monitored event takes place, i.e., the image to be recorded currently is same as a previously recorded image, representing the state in which no change has occurred with regard to the intruding object and the background or when decision is made such that the image recorded precedently is same as the image to be recorded currently, i.e., when no monitored event has occurred, then the image recording is omitted. In this way, memory consumption brought about by the image recording can be suppressed to a minimum.

In FIG. 3, frames as selected are illustrated at a row 330. As will now be understood, by effectuating the filtering operation (i.e., thinning) in dependence on the occurrence of monitored event, the memory consumption to a certain extent will be incurred by the recording during a time zone in which the image changes at a relatively high frequency. However, when the image remains less changed as in the case of monitoring in the nighttime, memory consumption due to redundant recording can be suppressed, whereby recording over an extended time period can be realized. Further, since the images picked up during the time period in which the image recording is omitted is same as the image of the scene where no change has occurred in respect to the intruding object(s) and the background or the image recorded immediately before, the image search request for the time zone or time point at which the image recording has been omitted can be coped with by displaying the correspondent image vice the omitted one.

The monitoring image information stored in the auxiliary storage unit 160 is composed of the image data 161 and the monitored event database 162 containing temporal information indicating the time point at which the image data was acquired. Accordingly, in the case of the example illustrated in FIG. 3, the search or retrieval request to the effect that the image at a time point "1" be displayed can be fulfilled by displaying the image at a time point "0" in place of the image at the time point "1".

FIG. 4 is a view for illustrating another image recording scheme which differs from that illustrated in FIG. 3.

Shown at a row 340(b) is a chart for illustrating the image sampling timing. In the case of the image recording scheme described previously by reference to FIG. 3, decision as to occurrence of the monitored event is made after thinning the frames. By contrast, in the case of the image recording scheme illustrated in FIG. 4, the monitored events are detected from all the frames of the video image inputted directly without performing the frame thinning operation, whereon the image recording is carried out at a preset sampling interval, e.g. three times per second, after the event period has been determined. In that case, by setting the sampling interval to one frame per thirty seconds which is same as that for the input image, it is possible to record the input image upon every occurrence of the event. In this conjunction, it should be mentioned that a plurality of preset image recording interval patterns may be changed over in dependence on the types or species of the monitored events.

The image recording scheme illustrated in FIG. 4 is suited for the applications where the moving direction of a moving object picked up by the monitoring camera or the like is to be detected as the monitored event. Besides, this image recording scheme can profitably be adopted in the image recording in which the dynamic image recording interval control described below is performed.

Figure 5B:
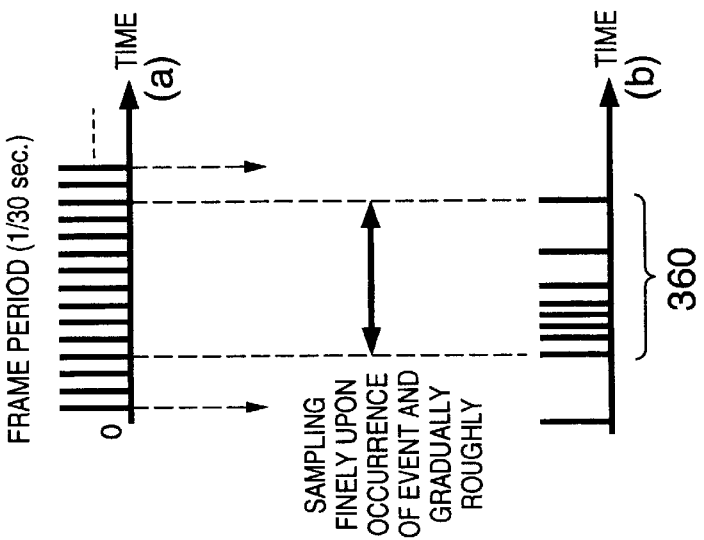
FIGS. 5A and 5B are views for illustrating a method of controlling dynamically a frame image sampling period or interval in dependence on changes of monitored event(s) in the system for recording images relevant to monitored events as detected according to the present invention.
Figure 5A:
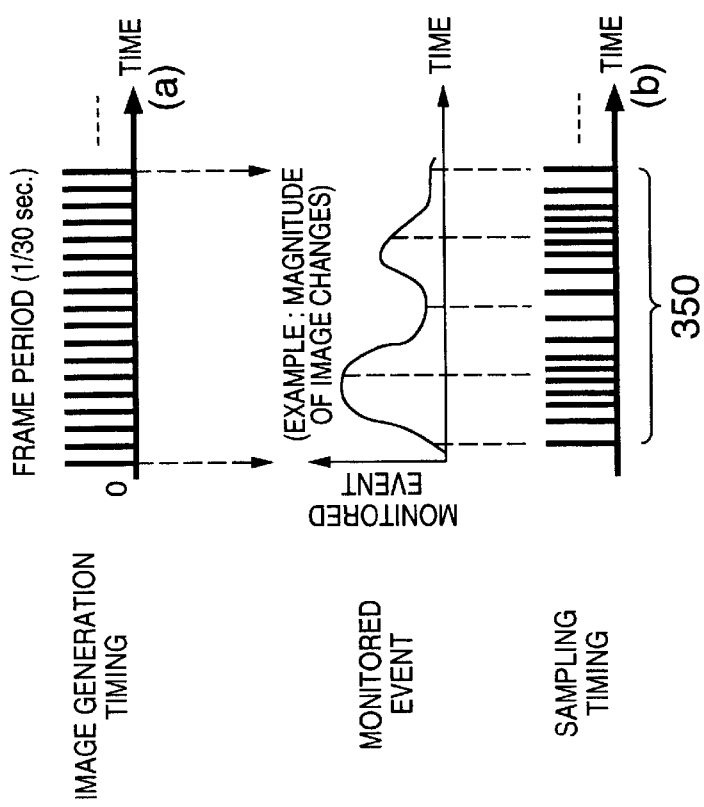

FIGS. 5A and 5B are views for illustrating an image recording scheme in which the dynamic image recording interval control is adopted.

Shown in FIG. 5A at a row 350 and in FIG. 5B at a row 360 are sampling timing charts, respectively.

The basic concept underlying the image recording now under consideration is essentially same as that of the image recording described previously by reference to FIG. 4 in that the monitored events are detected for recording from all the frames of the input video image signal by performing the sample thinning operation. The image recording scheme illustrated in FIGS. 5A and 5B differs from the one illustrated in FIG. 4 in that the sampling interval is dynamically changed in the case of the former by contrast to the latter in which the sampling interval is fixed for the recording. As can be seen from the timing chart 350 shown in FIG. 5A, in the image recording according to the instant embodiment of the invention, the monitored event information is recorded in linkage with the sampling interval.

More specifically, changes in a succession of image frames are detected as the monitored event. To this end, absolute difference values of individual pixels may be arithmetically determined for the latest frame image and the immediately preceding frame image, respectively, whereon a total sum of the absolute difference values is determined. The total sum thus obtained is of such nature that it assumes a large value when the image picked up by the camera contains a relatively large number of moving objects or when motion of the moving object(s) is rampant or speedy or when luminance of the image frame changes remarkably while assuming a value substantially equal to zero when the change is insignificant.

By taking advantages of the nature mentioned above, it is taught according to the present invention to control the sampling interval in dependence on magnitude of the above-mentioned value. More specifically, when the value is small, the sampling interval is increased, e.g. from twice per second to four times or so per second, whereas when the value is large, the sampling interval is decreased to thirty times or so per second. Then, a series of monitoring images as recorded can be reproduced, substantially approximating a moving picture or motion picture, when many moving objects are seen in the images picked up by the monitoring camera or when the object in the picked images moves impetuously, whereas when the object(s) picked up by the monitoring camera moves only slowly, i.e., when no or little change can be seen in the object picked up by the monitoring camera, the images outputted therefrom will be recorded shatteringly in an animation-like fashion.

With this image recording scheme, such recording can be realized that the changes of the object(s) seen in the image frames remains within a predetermined range. Thus, when motion of a person or persons are to be recorded, the recording can be performed for every predetermined motion.

Furthermore, there may be established previously the rules for controlling of the sampling interval, as illustrated in FIG. 5B, being designated by reference numeral 360. By way of example, let's suppose a monitoring system for monitoring an entrance of a room through which man can enter by opening a door installed at the entrance. In that case, it will be important that image of the face of a person entering the room can be recorded. To this end, the monitored event (change in the image) can be detected, for example, when a region of flesh-tint exceeds a preset value or range, whereon recording is started initially with a short sampling interval which is then increased progressively. In this way, frame images showing the face or complexion of the person who is entering the room can be recorded without fail.

As will now be appreciated, in the image recording/playback apparatus according to the present invention, decision as to execution of recording and control of the image recording interval are validated in dependence on the monitored events, whereby the image recording can be carried out over the extended time period without incurring recording omission of the event under monitoring such as motion, performance, behavior pattern or the like.

As a modification of the means for detecting the monitored event, such arrangement may be adopted that occurrence of the monitored event such as "moving object" or "change of illumination" is determined when the number of fields in the input frame image which differ significantly from one another exceeds a predetermined value.

Further, the means for detecting the monitored event may be implemented such that when time-dependent variations or changes in the number of the fields in the input frame image which differ significantly from one another exceed a predetermined value, decision is made that the monitored event "change of the background" has occurred.

Furthermore, the means for detecting the monitored event may be implemented such that when the number of regions or fields in the input frame image which are colored in flesh-tint exceeds a predetermined value, decision is made that the monitored event "face candidate field exists" has occurred.

In this conjunction, the degree of difference among the fields or regions mentioned above may be determined, for example, by arithmetically determining mean values of the tints or luminances on a block-by-block basis from a given image recorded in the past and an image inputted currently, respectively, whereon absolute values of differences among the corresponding blocks are determined, respectively. Then, the maximum value of the absolute values can be regarded as indicating the degree of difference.

Alternatively, the degree of difference may be determined as a moving average value of time-series values obtained by calculating, respectively, absolute values of differences among the corresponding blocks in the mean values of tints or luminances on a block-by-block basis for the image frames inputted from a given time point in the past up to the current time point.

Figure 6:
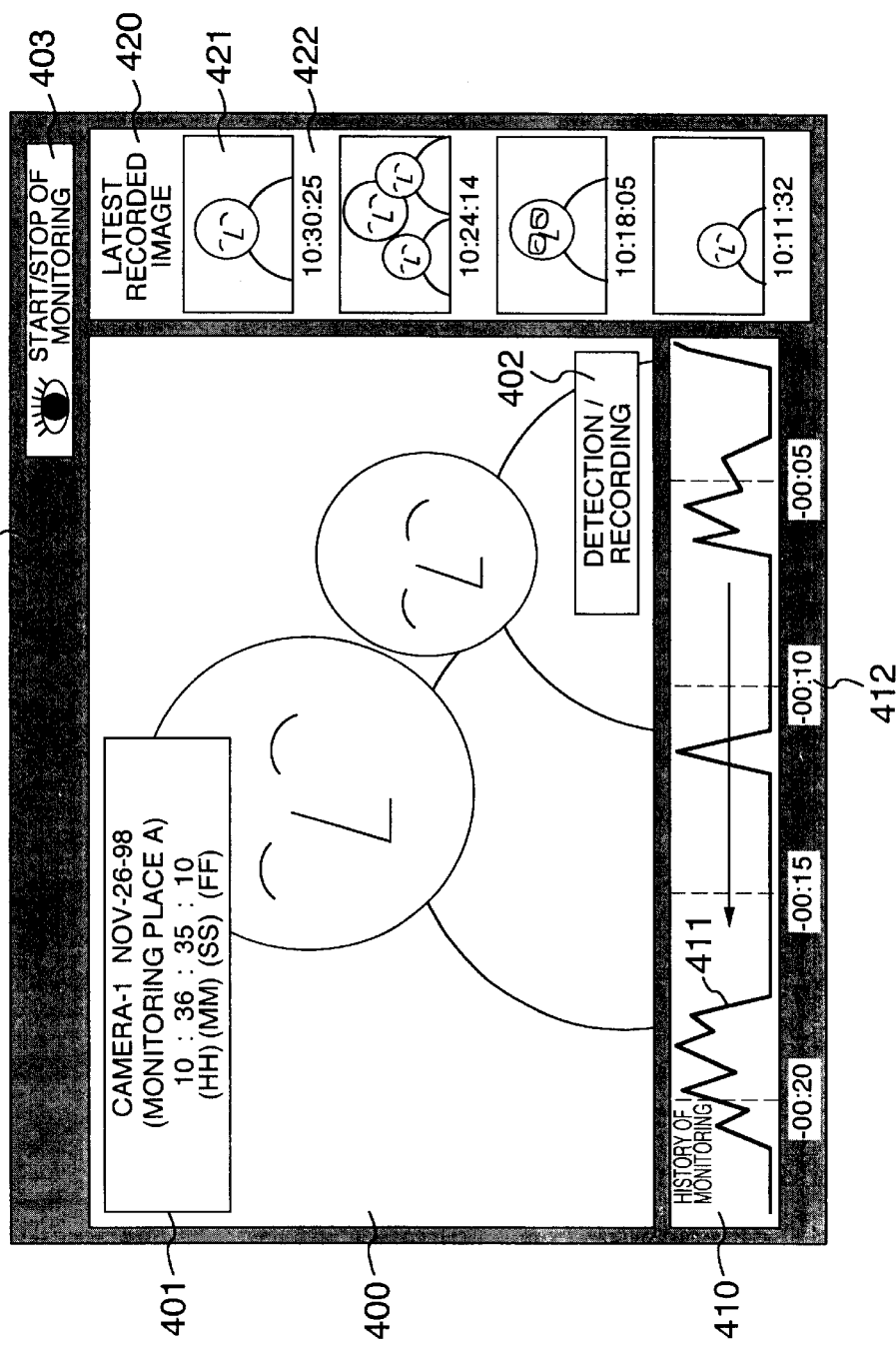
FIG. 6 is a view for illustrating a screen image generated in an image recording mode of the monitoring image recording/playback apparatus according to an embodiment of the present invention.
Figure 7:
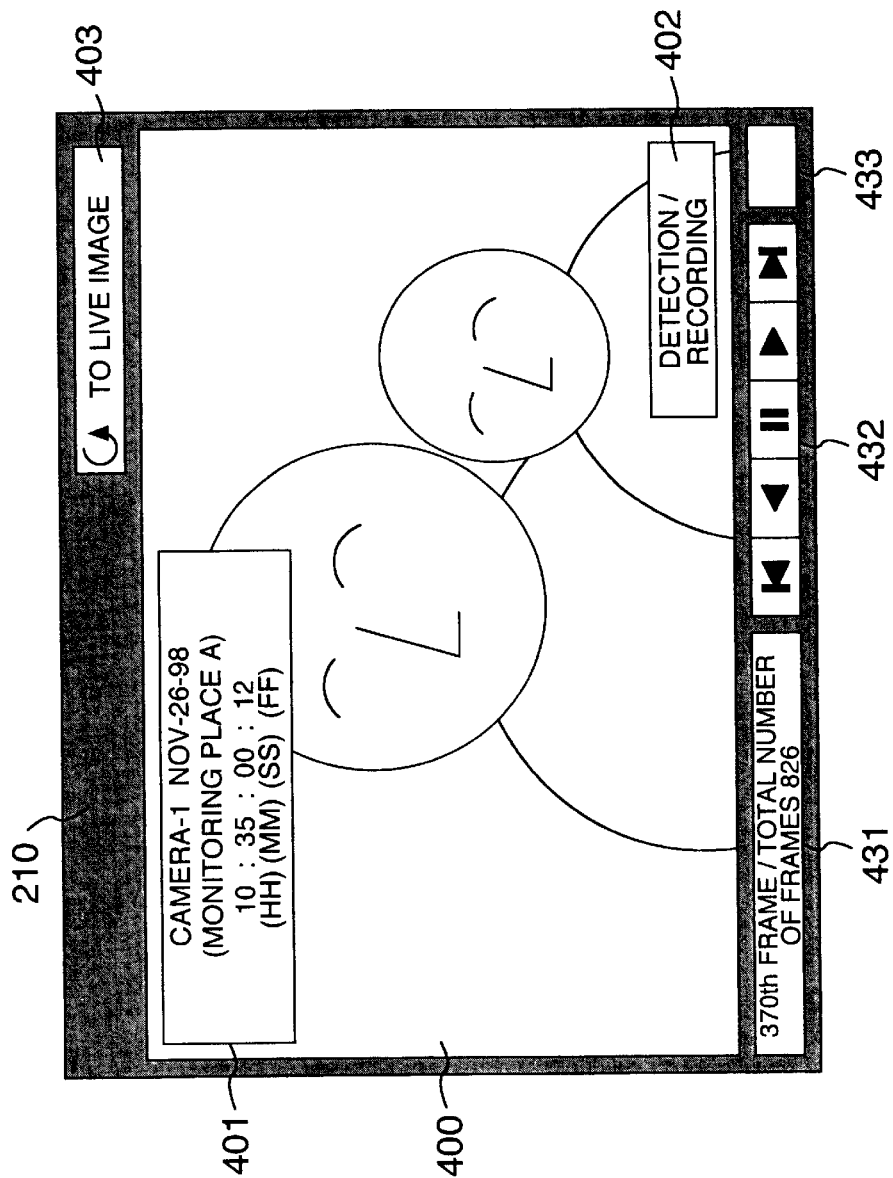
FIG. 7 is a view for illustrating a screen image generated in a reproduction mode of the monitoring image recording/playback apparatus according to an embodiment of the present invention.
Figure 8:
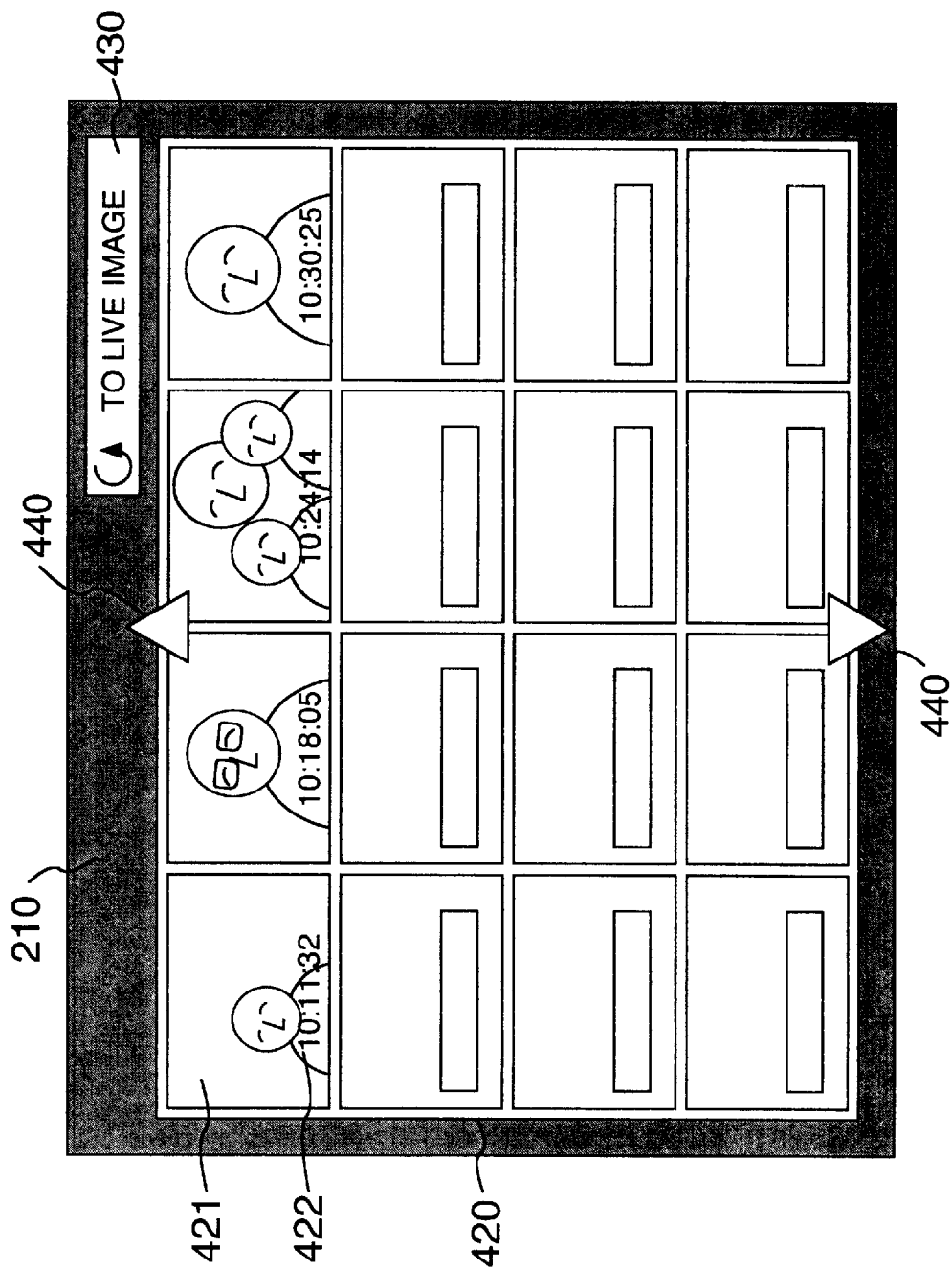
FIG. 8 is a view for illustrating a list displaying screen image generated by the monitoring image recording/playback apparatus according to an embodiment of the present invention.

FIGS. 6, 7 and 8 are views for illustrating screen images generated upon image recording and reproduction in the monitoring image recording/playback apparatus according to an embodiment of the present invention. These screen images are displayed on the screen of the display device 210 which is covered with the touch panel 130.

More specifically, FIG. 6 shows a screen image in the image recording operation mode. Basically, the screen image is constituted by a main display field 400 for displaying the image being inputted currently and other fields disposed around the main display field 400. Hereinafter, the main display field 400 will also be referred to as the input image field. Displayed on the screen image, being superposed, are a monitored event information display field 401 indicating relevant location and date, etc. and a marker field 402 indicating that a monitored event is being currently detected and that the recording is being performed currently.

In FIG. 6, reference numeral 403 designates a button for controlling the start of the image monitoring operation of the monitoring system.

The monitored event information display 401 may contain identifier (ID) indicating the place or location which is currently photographed by the monitoring camera (the name of the monitoring place registered previously by the user), date (year: month: day), a time code (hour: minute: second and identifier number of the frame(s) appearing within a current time period of one second) and others.

By making use of the marker 402, there can be realized a method of messaging the user of the monitored event detection state and the image recording state. By way of example, blinking of the marker field 402 in yellow may be triggered for issuing a message that detection of a monitored event is started by the monitoring system. Further, momentary blinking of the marker 402 in red in the image recording mode may be used as a message indicating that the recording on the auxiliary storage unit 160 (i.e., transfer of the image data and the monitored event information data to the auxiliary storage unit) is being carried out.

Further referring to FIG. 6, reference numeral 410 denotes a field for messaging the user of history of the monitored event as detected. In the case of the illustrated example, a waveform graph 411 is displayed which indicates presence/absence of the monitored event information and intensity thereof (e.g. inter-frame difference value). The waveform graph 411 is shifted to the left progressively as the time lapses, whereby the latest monitored event information value is added in the form of waveform value at the right end of the display field 410. A time indicating display field 412 is disposed below the display field 410 such that the temporal distribution of the waveform data 411 as a whole can readily be comprehended. In the case of the illustrated example, time points preceding to the current time are displayed in minute. It should however be understood that the absolute time in hour and minute may be displayed.

Reference numeral 420 designates a display field for messaging the user of history of the monitored events as detected. In the case of the illustrated example, representative images 421 and time points 422 are displayed for every monitored event detected up to the current time point. More specifically, an image corresponding to the latest monitored event is displayed at the top of the display field 420, which is followed by displays of representative images 421 and the time points 422 disposed beneath the latest event image in the temporally descending order.

By clicking graphic portion or image portion in the display field 410; 420 with e.g. the pointing device 190, corresponding recorded image can be reproduced.

In the playback operation mode, display is changed over to the main display field 400 into which the recorded image is outputted, as will be described later in more detail by reference to FIG. 7.

By way of example, when the representative image in the display field 420 is touched or clicked, a series of image data 161 generated over a period during which the monitored event corresponding to the representative image has occurred are read out from the auxiliary storage unit 160 to be reproduced for display within the main display field (input field) 400. On the other hand, when the waveform portion in the field 410 is touched, a series of images falling within an event monitoring period closest temporally to the time point relevant to the clicked waveform are reproduced in the field 400. In synchronism therewith, the representative images of the monitored event displayed and the events preceding and succeeding, respectively, to the displayed event are displayed in the field 420. In that case, a vertical line of different color (not shown) may be displayed on the touched graph so that the user can readily visually identify the touched point.

In the case of the example described above, the fields 410 and 420 are juxtaposed with the main display field 400 in which the picture taken in the recording mode and the picture reproduced from the recorded images are displayed. It should however be understood that the fields 410 and 420 may be displayed separately from the main display field 400.

FIG. 7 is a view for illustrating screen images generated in the reproduction mode. As can be seen in the figure, upon reproduction, a variety of buttons for playback operations are renewedly displayed on top and bottom portions of the main display field 400. Needless to say, these buttons are virtual ones realized by combination of graphics displayed on the screen of the display device 210 and the touch panel 130. By touching these buttons with the pointing device 190 or the like, operations corresponding to those activated by pushing the buttons are carried out by the system.

In the main display field 400, there is displayed a moving picture (i.e., a series of display frames) being reproduced in like fashion as the input picture in the recording operation mode.

On the other hand, the monitored event information corresponding to the moving picture being reproduced is displayed in the monitored event information display 401.

The monitored event detection marker field 402 may be displayed equally in the reproduction mode. As will be described later on, in the image recording/playback apparatus according to the present invention, recording operation can be performed as the so-called background operation even in the reproduction mode. By way of example, when the user desires to reproduce a recorded picture in the course of recording the monitoring image, the marker field 402 can be displayed to inform the user of detection of occurrence of the monitored event during his or her perusal. Of course, the marker field 402 is not displayed so long as the image recording is being performed in the background.

In FIG. 7, reference numeral 430 denotes a button for resuming the recording display state illustrated in FIG. 6.

Further, reference numeral 431 denotes a display field for messaging the user of a total number of frame image data included in the event period of the monitored event picture being currently reproduced and the information concerning the serial frame number of the image which is being currently displayed.

Reference numeral 432 designates a row of buttons assigned, respectively, for forward reproduction of picture for display, pause, reverse reproduction, frame-by-frame feeding and other operations, respectively.

Finally, reference numeral 433 denotes a button for allowing transition or change-over to a representative image list display which will be described below.

FIG. 8 is a view illustrating a screen image for displaying a list of representative images for every monitored event as detected. Basically, this screen image is substantially same as the display field 420 shown in FIG. 6 except that the display field is enlarged also in the transverse direction, wherein representative images 421 and time points 422 are displayed, being arrayed in the raster scan sequence.

In FIG. 8, triangular buttons 440 disposed at top and bottom, respectively, of the display field serve for changing over the contents of the list display on a time base (along the time axis). More specifically, when the top button is pushed, the contents preceding temporally by one display unit is displayed on the current page. On the other hand, when the bottom button is pushed, the contents succeeding temporally by one display unit are displayed. When the first or last one of the monitored events recorded has been reached through user's manipulation, either the top or the bottom button which can no more advance the sequence of representative images is displayed in faded color, indicating that operation of the button in the advancing direction is no more possible.

Further referring to FIG. 8, when the user selects the representative image 421 by touching it with the pointing device, the corresponding reproduction screen is displayed, as described hereinbefore by reference to FIG. 7, whereby the picture of the event monitoring period as selected is reproduced.

Figure 9:
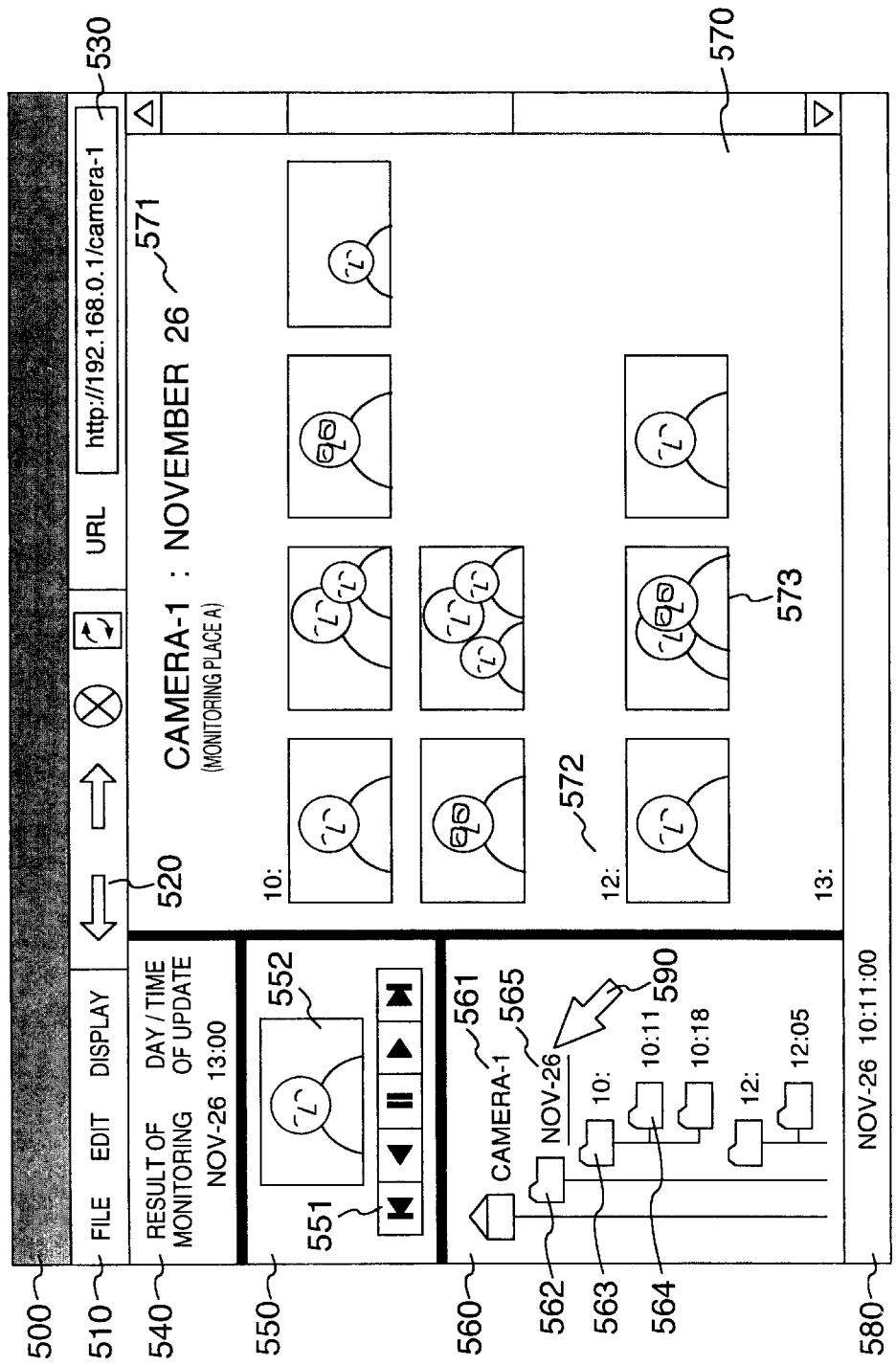
FIG. 9 is a view for illustrating a user interface for enabling manipulation of the image recording/playback apparatus for recording, reproduction and perusal of monitoring images at a remote place such as a monitoring center.

FIG. 9 is a view for illustrating a user interface which enables manipulation of the image recording/playback apparatus 100 and recording, reproduction and perusal of the monitoring images at a remote place such as a monitoring center. More specifically, this figure shows a screen display 500 generated on a display of a personal computer 220 installed at a remote monitoring center.

In the case of the exemplary embodiment of the invention now under consideration, a WEB server 650 (shown in FIG. 10) and a WEB browser 501 (shown in FIG. 10) are employed for realizing control and perusal for the image recording/playback apparatus 100 from the personal computer 220 installed at a remote place by way of a network 502. The WEB server is installed in the image recording/playback apparatus 100 and a WEB page 500 (FIG. 9) on the WEB browser of the personal computer 220 located at the remote place is displayed, as will be described later on. In the following, description will first be directed to the page mentioned above.

Referring to FIG. 9, a menu 510, a browse button 520, a URL (Universal Resource Locator) display field 530 and a browser status display field 580 constitute parts of a WEB browser controlling user interface for displaying the monitoring information page 500.

In addition to the browser components mentioned above, the monitoring information page 500 is generally composed of four display fields, i.e., a field 540 for displaying the latest or most updated time of the monitoring data, a field 560 for displaying monitored events with date/time information (year, month, day/time) for every monitoring place (camera-installed location) in a tree structure, a field 570 for displaying in a list the representative images for the monitored events at every designated time (date and hour) and a field 550 in which a picture for an event monitoring period selected in the tree display field 560 or a list display field 570 is displayed in the reproduction mode.

In the field 540, there is displayed information messaging the user of the time at which the monitoring data being displayed currently was picked up or recorded. In this conjunction, it is noted that with the dialogue facility of such type as the WEB, difficulty is generally encountered in sending consecutively and constantly updated information from the server to the browser. In other words, the information can be presented to the browser only in a static state preceding to a particular time point (because of insufficient bandwidth of the intermediate network such as WAN, high cost involved for maintaining communication line, heavy CPU load imposed on both the server and the clients). For these reasons, such situation may arise frequently that when a command for perusal of the result of monitoring at a remote place is issued in the course of recording the monitoring image by the image recording/playback apparatus 100, the page contents become frequently different from the state stored internally of the image recording/playback apparatus 100. Accordingly, it is necessary to make the user be conscious of time difference. The field 540 serves to this end.

The field 560 which is designed to display the monitored events with the date/time information "year, month, day/time" for every monitoring place (for every monitoring camera location) in a tree structure provides the interface which allow the user to reach the place and/or the date for which the user desires the perusal. The tree display is structured hierarchically with four levels, i.e., the place or location 561, date (year: month: day) 562, time 563 and the monitored event level 564 as viewed in the descending order. When a given one of icons or folders at a given node of the tree is clicked in the state where the nodes of hierarchically lower level are not displayed, the clicked icon is changed over to the image of opened folder, and the nodes of lower level are displayed. On the other hand, when the nodes of lower level are displayed, the folder icon is changed to the image of closed folder with the nodes of lower level being hidden. In this way, the user can always open only the concerned node for the perusal.

When a text row 565 at each node is clicked, the display contents of the image reproduction display field 550 and the representative image list display field 570 change. By way of example, when the text row 565 associated with three higher level nodes, e.g. place 561, date (year: month: day) 562 and time 563 are clicked, the monitored event list of the latest date/time within the range validated by clicking is displayed in the field 570.

When the text row of the monitored event level 564 which is the hierarchically lowest node is clicked, then the recorded picture for the relevant event monitoring period is reproduced in the image reproduction display field 550.

In FIG. 9, reference numeral 570 designates a field in which a list of representative images for every detected monitored events covered by designated time periods, respectively, are displayed, similarly to the display field 420 shown in FIG. 6. As can be seen in the figure, there are displayed in the representative image list display field 570 information 571 concerning the place and the date for the image list being displayed, time information 572 indicating the time period on an hour-by-hour basis and the representative images 573. In the case where the time information is unavailable, as encountered upon activation of the browser, a list of representative images falling within the latest time period is displayed.

When a given one of the representative images 573 is clicked, a picture (i.e., a series of recorded images) recorded during the relevant event monitoring period is reproduced in the image reproduction display field 550 in an animation-like fashion.

In this conjunction, it should be recalled that in the case of the conventional time-lapse video recorder, the results of monitoring are presented simply in the temporal order upon reproduction thereof, which thus requires an extremely extensive time.

By contrast, by virtue of the user interfaces described above by reference to FIGS. 6 to 9, the results of monitoring can be presented hierarchically in conformance with the temporal structure while the representative images which facilitate grasping of the contents of the monitored events can be presented in a two-dimensional array like a tiled image fashion, so to say.

The tree display makes it possible to make access to the concerned date and time at a high speed, which has heretofore been impossible with the conventional time-lapse video recorder. Besides, the picture of concern can be reproduced substantially instantly. These features are very effective for performing the search by figuring out approximately the target. Furthermore, the two-dimensional array of the representative images allows the user to survey roughly or browse a plurality of monitored events at a glance, whereby the time consumption incurred otherwise, e.g. for searching on an image-by-image basis, can be reduced significantly.

As will now be appreciated, according to the teachings of the present invention incarnated in the embodiments described above, the survey or perusal of the monitored events as well as confirmation of the contents thereof can be accomplished with a high speed and a high efficiency. In reality, the field test performed by the inventors has shown that the time required for the search can be reduced by 1/30 to 1/100. In brief, the present invention provides the interface which can ensure enhanced usability and advantageous time-saving effect.

Figure 10:
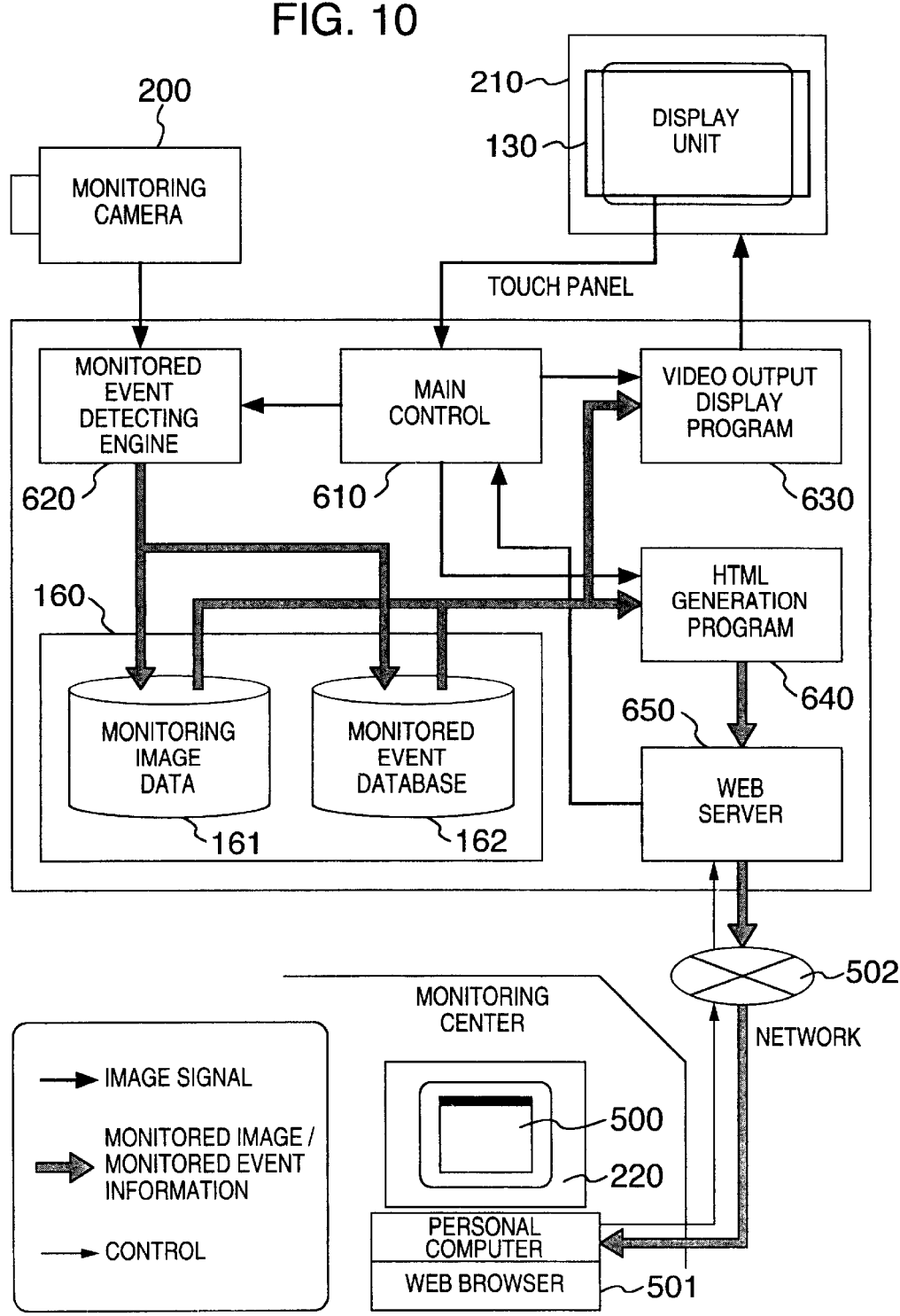
FIG. 10 is a schematic block diagram for illustrating a functional configuration of the image recording/playback apparatus according to an embodiment of the present invention.

FIG. 10 is a functional block diagram for illustrating a configuration of the image recording/playback apparatus 100 from the functional standpoint. Referring to the figure, the image recording/playback apparatus 100 is comprised of five major components. They are a main control module 610, a monitored event detecting engine 620, a video-output display program 630, an HTML (TyperText Markup Language) generation program 640 and a WEB server 650.

The main control module 610 is so designed or programmed as to realize the major functions of the control program 171 described hereinbefore by reference to FIG. 2 and in charge of controlling the image recording/playback apparatus 100 as a whole. In more concrete, the main control module 610 detects the user commands and the like inputted to the system by means of the touch panel 130 and the WEB server 650 to thereby control correspondingly operations of the monitored event detecting engine 620, the video-output display program 630, the HTML generation program 640 and the WEB server 650.

The monitored event detecting engine 620 is designed to serve for detecting the monitored events registered previously from the video signal inputted from the monitoring camera 200 to store the monitoring video data and the monitored event information data in the auxiliary storage unit 160 as the monitoring image data 161 and the monitored event database 162, respectively.

The video-output display program 630 is designed to output for display the images, as described hereinbefore by reference to FIG. 6. More specifically, the video-output display program 630 reads out the monitoring image data 161 and the monitored event database 162 from the auxiliary storage unit 160 in response to the user command inputted and transferred to the main control module 610 by way of the touch panel 130 to thereby display the relevant image(s) and the monitored event information as concerned on the screen.

The HTML generation program 640 serves for generating dynamically HTML for outputting the WEB page of the monitoring image(s) elucidated previously by reference to FIG. 9. In more concrete, manipulation of the user performed on the remote personal computer 220 is transferred to the main control module 610 from the WEB page 500 through the medium of the WEB server 650. In accordance with the user command or request inputted to the remote personal computer, the monitoring image data 161 and the monitored event database 162 are read out from the auxiliary storage unit 160 to thereby write an HTML tag indicative of a link between the monitored event information and the position of image on the WEB server in the HTML data prepared in advance. In this way, the dynamic HTML generation can be realized.

The WEB server 650 serves to transfer the WEB page created through the procedure mentioned above to the personal computer 220 disposed at a remote place and transfer the user request or command as inputted to the main control module 610.

Figure 11:
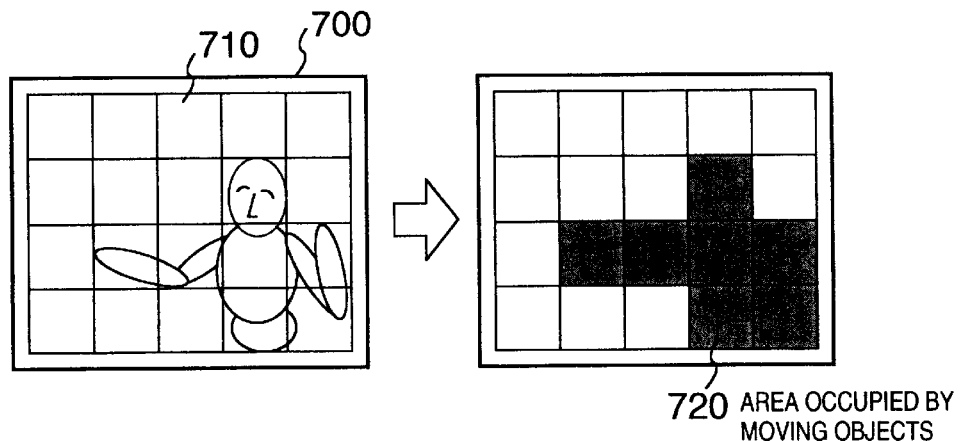
FIG. 11 is a view for illustrating a method of setting areas or fields concerned and results of event detection in the areas as carried out by a monitored event detecting engine in the course of executing a procedure for detecting the monitored event according to an embodiment of the present invention.
Figure 12:
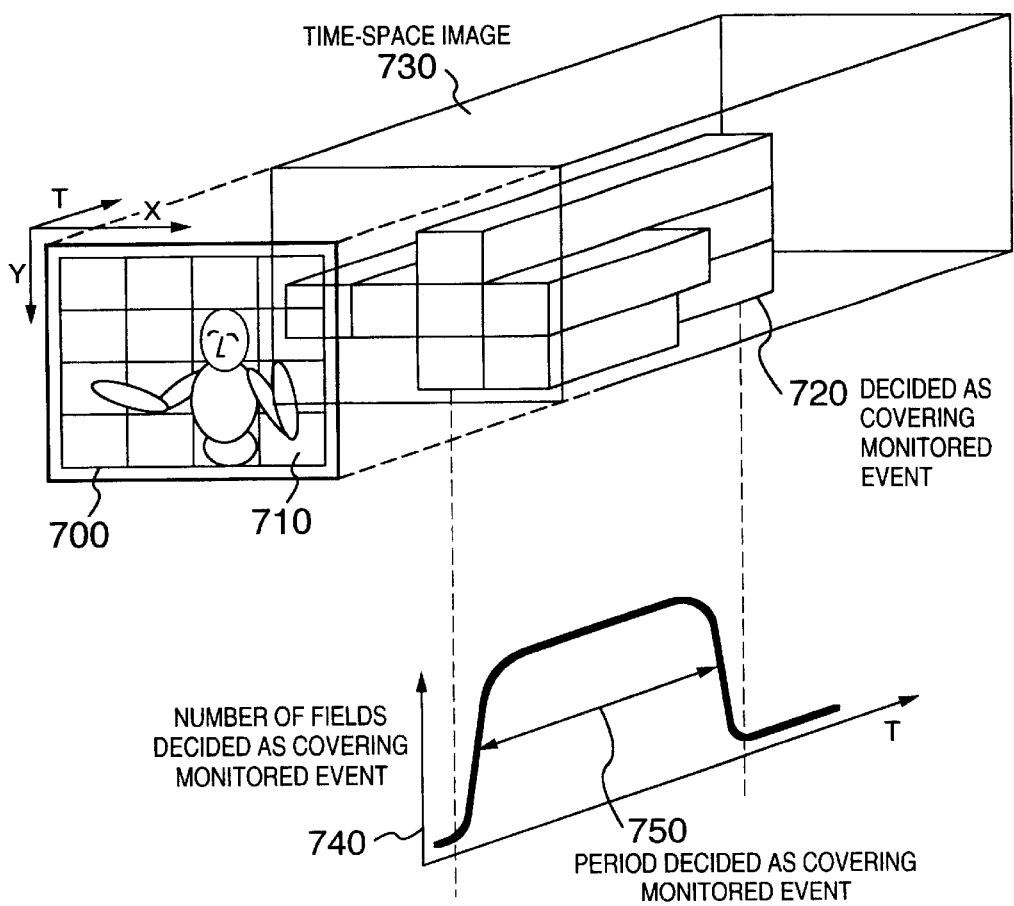
FIG. 12 is a view for illustrating a time-space image generated by setting the concerned areas shown in FIG. 11 in the course of executing the procedure for detecting the monitored event by the monitored event detecting engine according to an embodiment of the present invention.
Figure 13:
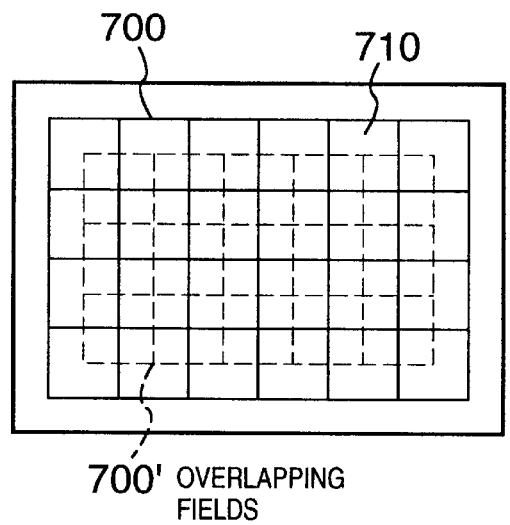
FIG. 13 is a view for illustrating another method of setting areas concerned in the course of executing the procedure for detecting the monitored event, which method is carried out by the monitored event detecting engine according to an embodiment of the present invention.

FIGS. 11, 12 and 13 are views for illustrating a method of detecting the monitored event, which method is carried out by the monitored event detecting engine 620.

In the following description, it is presumed that presence/absence of a moving object is a matter of concern for monitoring.

At first, individual frame images 700 are extracted from the video inputted. Subsequently, the frame image is divided into small rectangular areas 710 for detecting presence/absence of image change in each of the small rectangular areas 710, as is illustrated in FIG. 11.

As a method or scheme for determining discriminatively the changes of the image, there may be adopted, for example, the method disclosed in U.S. Pat. No. 5,721,692. According to this method, it is possible to detect the background, the moving object, changes of the background structure and changes of illumination in each of the small rectangular areas 710 of concern.

In the following, a moving object detecting method in each of these areas will be described briefly.

Firstly, the area aimed is selected from the frame image and the image of that area at a time point where no moving object is observed in that area is set as the background image.

Subsequently, the degree of difference of the image is arithmetically determined between the background image and the latest one of the image updated every input. As a typical example of such arithmetic determination, differences in brightness of individual pixels at corresponding positions in the background image and the latest input image are determined, whereon a sum of squared differences is determined as the degree of difference between the background image and the inputted image. Alternatively, a sum of squared differences in the RGB values may be used as the degree of difference.

The degrees of difference determined in this way are arrayed sequentially along a time axis so that they can be observed in the form of a continuous graph. In that case, the graph will exhibit significant variation during the time period in which a moving object is detected. By contrast, during the time period in which no moving object is present, the graph will remain flat more or less with little change. Further, when the background of the input image is utterly same as that selected as the background image, i.e., so long as the contents of the input image are same as the background image, the mean value of the degrees of difference will remain substantially zero during the corresponding time period. On the other hand, when the structure or pattern of the background changes due to, for example, placement of an article, the mean value will then assume a greater value which remains substantially constant during the corresponding time period with the graph remaining substantially flat at that value, because of change in the contents of the background image.

By taking advantage of the facts mentioned above, it is possible to confirm or observe presence/absence of moving object(s) and changes of the background structure for any given time period. What the matter is in this conjunction is how to determine at first the image to be adopted as the background image. This problem can be solved by determining the graph representing changes in the degree of time-dependent differences of the images picked up appropriately at given time points, and by selecting the image at the starting time point of the period during which the graph remains flat as the background image. When the structure of the background changes in the succeeding processing, then the image in the time period during which the above-mentioned graph continues to remain substantially constant after the change of the background image may be renewedly set as the background image. The background image setting procedure described above may be repetitively executed in this manner as occasion requires.

Through the procedure described above, the areas concerned in which the moving object exists can be made discriminable from those in which no moving object exist among the areas set on the frame image by coloring or imparting brightness level distinguishably from the others, as illustrated in FIG. 11 at the right-hand side.

FIG. 12 is a view for illustrating a threeI dimensional time-space image generated by carrying out the processing described by reference to FIG. 11 for all the frame images and disposing the processed frame images in the time-sequential order. In the three-dimensional time-space image, the moving object makes appearance as a componential cubic image 720, as can be seen in FIG. 12. On the basis of the time-space image 730, the monitored event, i.e., "existence of a moving object" may be decided in dependence on whether the constituent cubic space of a certain size can be observed in the time-space image. A graph 740 illustrated in FIG. 12 beneath the time-space image represents occurrence of the monitored event, as viewed from another standpoint. More specifically, the graph represents the number of the divided areas in which image change has occurred in each image frame. Thus, the time period 750 shown in FIG. 12 in which the graphic curve continues to be substantially constant at a value greater than a predetermined one may be regarded as the time period in which the monitored event has taken place. The time period determined in this way is identified or decided discriminatively as the event monitoring period during which the moving object exists. Thus, the start frame of the event monitoring period, the end frame thereof, the length of the time period and the results of decisions made on the area-by-area basis are stored in the auxiliary storage unit 160 as the monitored event database 162.

At this juncture, it should parenthetically be mentioned that although the method of deciding the event monitoring period by regarding the whole image as one area or region is certainly a possible option, the procedure of dividing the whole image into small areas and identifying the occurrence of event on the basis of results of the decision as to change in the property of the individual areas is more suited for handling the monitored events. By way of example, operation of the detecting engine can be made robust against external disturbances of small magnitudes. Besides, the areas excluded from the decision can easily be set. Additionally, the area-based event decision procedure described above by reference to FIGS. 11 and 12 is advantageous in that procedures for the search processing and the representative image selection processing (both of which will be described later) can be stated briefly.

Detection of other concerned events such as changes in the background structure (e.g. replacement of article(s) or the like in the place being monitored), appearance of face areas or the like can be realized with enhanced stability on the intra-frame area-by-area detection basis, as described previously.

In the foregoing description, it has been assumed that the areas concerned are each of rectangular shape. However, the present invention is never limited to any particular shape. The area may have any other shape. Furthermore, although it has been assumed in the foregoing description that the small areas are juxtaposed in a regular array pattern (see FIG. 11), the present invention is never restricted to such array. By way of example, a first regular array of small areas indicated by phantom line in FIG. 13 may be disposed in superposition on a second array composed of plural areas disposed regularly as indicated by solid line in FIG. 13, wherein logic operation may be performed on the basis of the result of processings executed on the basis of the areas of these two types of arrays. In that case, the discriminative decision as to occurrence of the event concerned can be realized over an extensive monitoring space with high stability and reliability while reducing effectively the areas for the decision.

Figure 14:
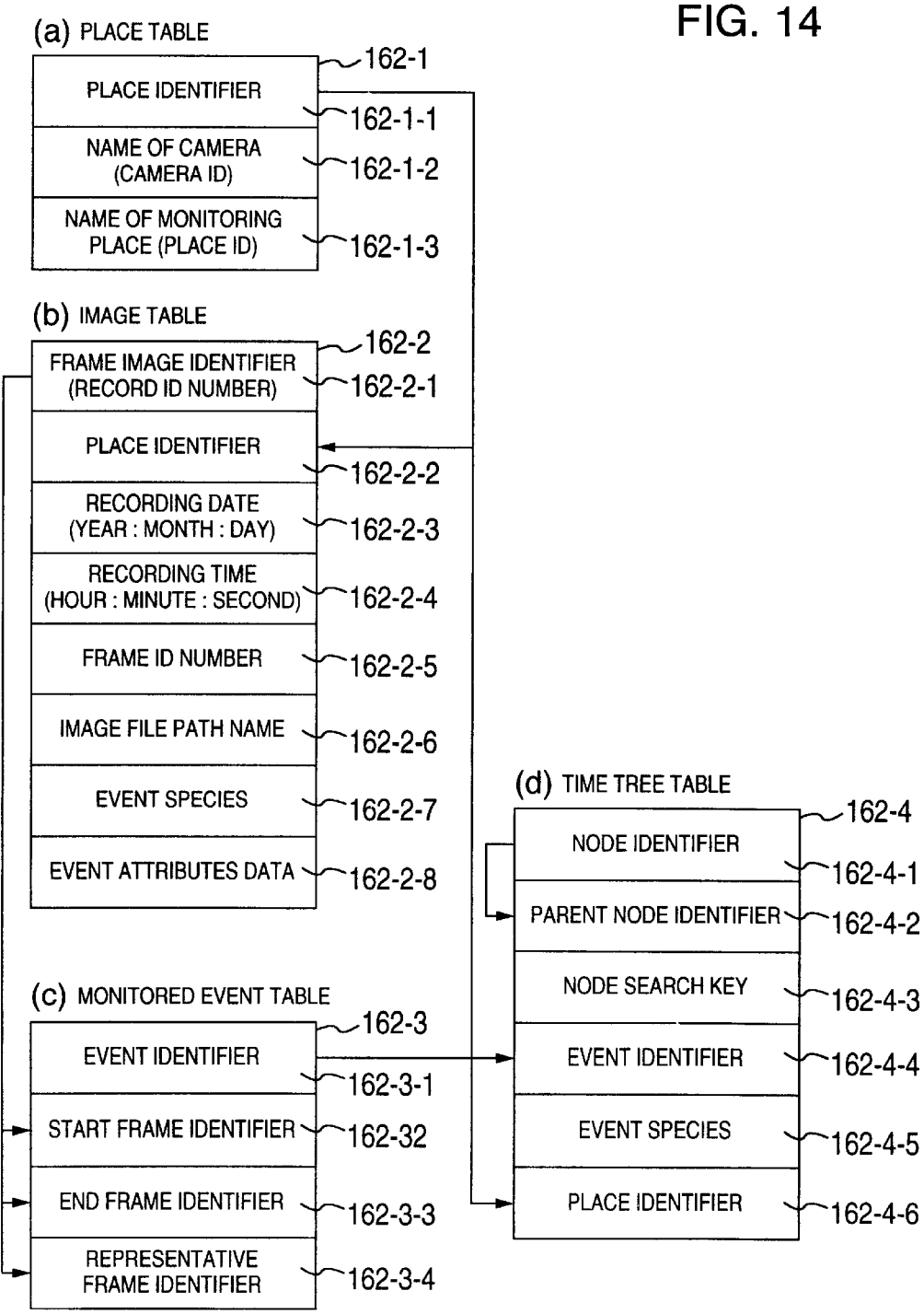
FIG. 14 is a diagram for illustrating a data structure of a monitored event database according to an embodiment of the present invention.

FIG. 14 is a view for illustrating a data structure of the monitored event database 162.

The monitored event database 162 is implemented as an RDB (Relational DataBase) and comprised of four tables. They are a place table 162-1, an image table 162-2, an event table 162-3 and a time tree table 162-4.

The place table 162-1 contains therein records including identifiers (ID) 162-1-1 of the monitoring cameras to which the monitoring image recording/playback apparatus 100 is connected, names 162-1-2 of the cameras and names 162-1-3 of the monitoring places. The place table 162-1 is prepared independently in order to reduce redundancy of individual records in the image table 162-2.

The image table 162-2 is provided for the purpose of controlling the individual frame images stored in the image recording/playback apparatus 100. This table contains items of frame image identifier (record ID numbers), place identifier (ID) 162-2-2, recording date (year: minute: second) 162-2-3, recording time (hour: minute: second) 162-2-4, frame ID number 162-2-5, image file path name 162-2-6, event species 162-2-7 and event attributes data 162-2-8, respectively. The place identifier (ID) 162-2-2 is same item as the identifier 162-1-3 of the place table 162-1, where the actual ID number is stored in both the tables. The recording date (year: month: day) 162-2-3, the recording time (hour: minute: second) 162-2-4 and the frame ID number 162-2-5 are time information concerning the data and the time at which the frame image of the frame ID number 162-2-5 was recorded. In most of the general-purpose relational databases, the date data (year: month: day) and the time data (hour: minute: second) are separately handled as the data species capable of being handled at high speed. Accordingly, in the case of the instant embodiment of the invention, each of these data are divided into three data pieces, i.e., year: month: day and hour: minute: second. Stored in the image table 162-2 at the image file path name 162-2-6 are path names for the image files stored internally of the system to be referenced for reading out actual image data upon reproduction and search of the monitored event image of concern. On the other hand, stored in the image table 162-2 at the event species 162-2-7 is the data indicating what kind of monitored event is recorded in the stored frame image. On the presumption that a plurality of monitored events may possibly overlap each other, the species of the monitored events are indicated by bit flags. The event species data 162-2-7 are referenced upon filtering performed on an event-by-event basis for reproduction and retrieval of the monitoring image. Stored as the event attributes data 162-2-8 are the characteristic quantity data of the individual areas on the basis of which the event has been detected.

The event table 162-3 is referenced upon handling of the time period information of the monitored events. The event table 162-3 contains event identifier (ID) 162-3-1, start frame identifier (ID) 162-3-2, end frame identifier (ID) 162-3-3 and representative frame identifier (ID) 162-3-4. As the start frame identifier (ID) 162-3-2 and the end frame identifier (ID) 162-3-3, the frame image identifier (ID) 162-2-1 of the image table 162-2 is stored. Similarly, the frame image identifier (ID) 162-2-1 selected by a representative image determining algorithm which will be described later on is stored as the representative frame identifier (ID) 162-3-4.

The time tree table 162-4 is a sort of table which is provided for enabling high-speed access to the event information with time designation, as in the case of the tree display field 560 shown in FIG. 9. The time tree table 162-4 is composed of node identifier (ID) 162-4-1, parent node identifier (ID) 162-4-2, node search key 1624-3, inter-node sequence 162-4-4, event identifier (ID) 162-4-5, event species 162-4-6 and place identifier (ID) 162-4-7. Although this table is redundant, it is provided for the purpose of enhancing the throughput upon accessing the results of monitoring. Basically, the time tree table 162-4 can dynamically be realized on the basis of three tables, i.e., the place table 162-1, the image table 162-2 and the event table 162-3. However, arithmetic operation for generating the time tree table has to be executed at a very high frequency in the monitoring picture reproduction/perusal operations. Accordingly, the time tree table is provided separately in the form of table with the aim to reduce the load imposed on the system. The node identifier (ID) 162-4-1 and the parent node identifier (ID) 162-4-2 represent fields for expressing the tree structure in the form of tables, respectively. The node search key 162-4-3 is a character string for accessing directly or straightforwardly the node of the lowest level with the aid of information concerning the place, the date (year: month: day) and the time (hour: minute: second). The parent node identifier (ID) 162-4-2 is set as the main key for enabling a hash search of the time tree table. Because of the character string, key generation is facilitated with the computation cost or overhead for the search being reduced. The event identifier (ID) 162-4-5 is same as the event identifier (ID) 162-3-1 of the event table 162-3 and represents the actual ID number. The event identifier (ID) 162-4-5 and the place identifier (ID) 162-4-7 are provided for, carrying out the filtering on the event-byIevent basis upon reproduction of the monitoring image as well as for searching.

At this juncture, description will briefly be made as to the times when the tables data mentioned above are generated. The place table 162-1 is created by the user before the monitoring operation is started. The data of the image table 162-2 and the event table 162-3 are dynamically generated in the course of actual image recording operation for monitoring. Data of the time tree table 162-4 is also generated in the course of the monitoring image recording operation. It should however be mentioned that the time tree table 162-4 is generated secondarily from the contents of the image table 162-2 and the event table 162-3. As mentioned previously, the time tree table 162-4 is prepared in order to enhance the throughput upon accessing the results of monitoring operation.

With the data structure described above, the image recording/playback apparatus 100 is capable of searching the monitored event recorded and the image for presentation at high speed. Besides, by virtue of the hardware system structure described hereinbefore by reference to FIGS. 2 and 10 and the data structure provided independently for every individual frame image, a novel function of allowing the perusal to be performed while performing the monitoring image recording operation simultaneously can be realized. In this conjunction, it should be added that such function is impossible to realize with the conventional monitoring/recording systems known heretofore.

Figure 15:
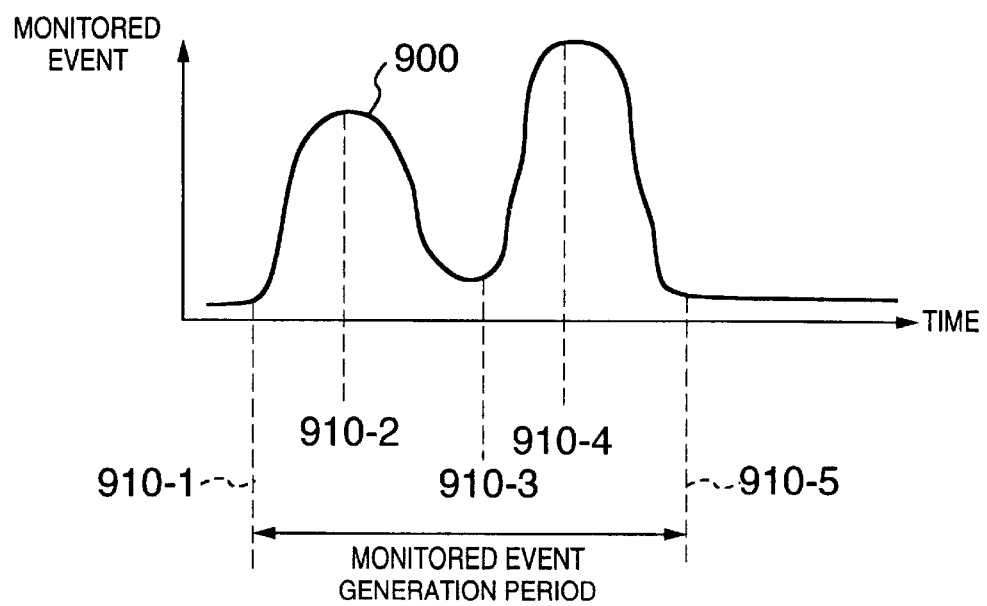
FIG. 15 is a view for illustrating algorithm for determining a representative image in an event occurrence period according to an embodiment of the present invention.

FIG. 15 is a view for illustrating algorithm or logical procedure for determining the representative image in the event monitoring period.

It is assumed, by way of example, that the event detected by the image recording/playback apparatus 100 is to be displayed in a same manner as the main display field 400 (FIG. 6) or the screen display 500 (FIG. 9). Selection of the image which represents the event monitoring period in the case where the event as monitored indicates presence of a moving object is an important matter which exert significant influence to the efficiency of perusal of the results of the monitoring.

By way of example, in case the start frame of the event monitoring period is selected as the representative image, such situation will occur frequently that only a small part of the moving object can be observed and thus the information concerning the detected moving object can scarcely be presented. Same holds true for the last or end frame. It may be conceived that simply an intermediate frame between the start frame and the end frame is selected as the representative image. Such selection of the representative image will however give rise to a problem in the case where two moving objects are detected in succession during one event monitoring period. Namely, in this case, the intermediate image as selected may be such image as picked up at a time point when both the moving objects are scarcely covered. For the reasons mentioned above, a same procedure as that for the control of the sampling interval described previously with reference to FIGS. 5A and 5B is adopted.

In more concrete, it is presumed that upon detection of the monitored event, a graphic curve such as designated by reference numeral 900 in FIG. 15 is obtained. On the presumption, a frame 910-4 at which the graphic value assumes a maximum value may be selected as the representative image, because in that case where the event as monitored can be considered as indicating the detection of a face of a person. On the other hand, in the case the event monitored indicates presence of moving objects, there will make appearance a plurality of local maximum values in the graphic curve. In that case, appearance of plural maximum values can be deemed to be equivalent to traversal of plural moving objects through one event monitoring period. In this case, the local maximum value 910-2 appearing at first may be selected as the representative image for the time being.

Next, description will turn to a scheme for realizing by HTML the monitoring picture display as presented on the user interface by the WEB browser described hereinbefore by reference to FIG. 9. Parenthetically, the technical terms used hereinafter are elucidated in detail by Uniform Resource Location or URL (http://w3c.org/).

Figure 16A:
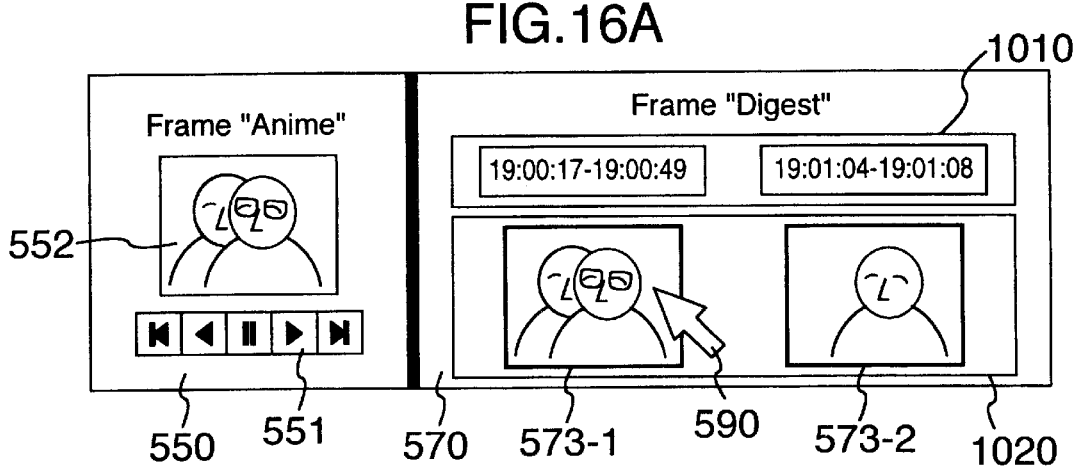

At first, referring to FIGS. 16A to 16C, description will be directed to a scheme for realizing reproduction of the recorded image of the relevant event monitoring period in the image reproduction display field 550 when the representative image 573 in the representative image list display field 570 is clicked. It is presumed that the individual areas are constituted by independent HTML display areas which are referred to as the frames, respectively. For convenience of the description, the representative image list display field will be referred to as the "Digest" data with the image reproduction display field being termed "Anime" data.

Data "Digest" and "Anime" are not static data. They are HTML data generated dynamically in accordance with the status of the WEB server. For generating these dynamic HTML data, server-side scripts (i.e., script operating at the WEB server side) such as CGI (Common Gateway Interface) and ASP (Active Server Pages) are employed.

In FIG. 16B, reference numeral 1000 denotes an example of HTML text data "Digest". In the case of the instant embodiment of the invention, <TABLE> tags are used for displaying the character string indicating the time point of the monitored event and the representative images thereof in tile-pattern arrays, respectively, as designated by reference numerals 1010 and 1020, respectively. The tag 1030 corresponds to the display 1010, while the tag 1040 corresponds to the display 1020. The display image 1020 is an area which can be clicked with the pointing device. This can be realized by enclosing the image tag 1042 representing the representative images 573 by using the hypertext tag <A> denoted by 1041. By designating the frame "Anime" as the destination for link jump and changing dynamically the HTML output contents in accordance with the clicked image, the images for every corresponding monitored event can be reproduced.

By changing over the corresponding destination in response to the click by the user, the character string serving as parameter is written previously in succession to a question mark at the jump destination of HREF which is an element of the hypertext tag <A>. As designated by reference numeral 1051, the frame image identifier (ID) indicating the record range of the image table 162-2 or the data capable of extracting the frame image identifier (ID) is preferred as the parameter to be written in.

Figure 17:
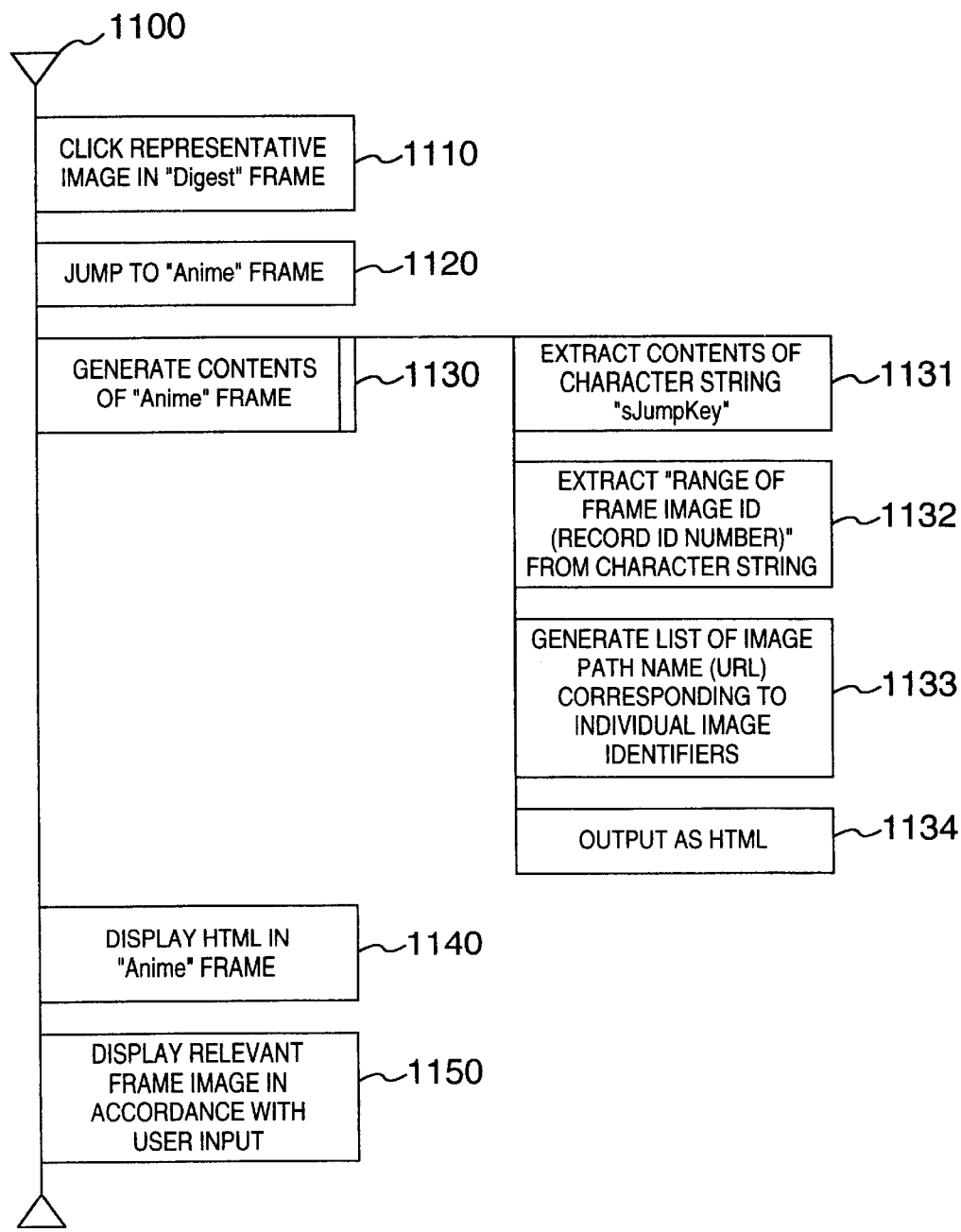
FIG. 17 is a flow chart for illustrating briefly a processing flow which is started upon clicking of a representative image on a list image display screen and which ends when an image is reproduced in an image reproduction display field according to an embodiment of the present invention.

FIG. 17 shows a flow chart (denoted generally by reference numeral 1100) for illustrating briefly a flow of processings which is started upon clicking of the representative image 573 and ends when an image is reproduced in the image reproduction display field 550 in the form of animation. At first, when the representative image 573 is clicked (step 1110), jump to the frame "Anime" designated at the WEB browser side is carried out (step 1120). The HTML data displayed as "Anime" are dynamically determined and generated from the parameter 1051 transferred upon jumping (step 1130). In more concrete, in a step 1132, the frame image identifier (ID) indicative of the range on the image table 162-2 is extracted from the character string assigned to the parameter named "s Jump Key" in a step 1131, whereon search of the relevant record is performed for the image table, to thereby extract the individual image path names as URLs (Universal Resource Locators) in a step 1133, which is then outputted in the HTML form (step 1134). The WEB browser displays the HTML data obtained in this way in the frame "Anime" in a step 1140. Finally, by making the relevant frame image visible or invisible in accordance with the user manipulation, the frame images are displayed in the form of animation (step 1150).

Figure 18:
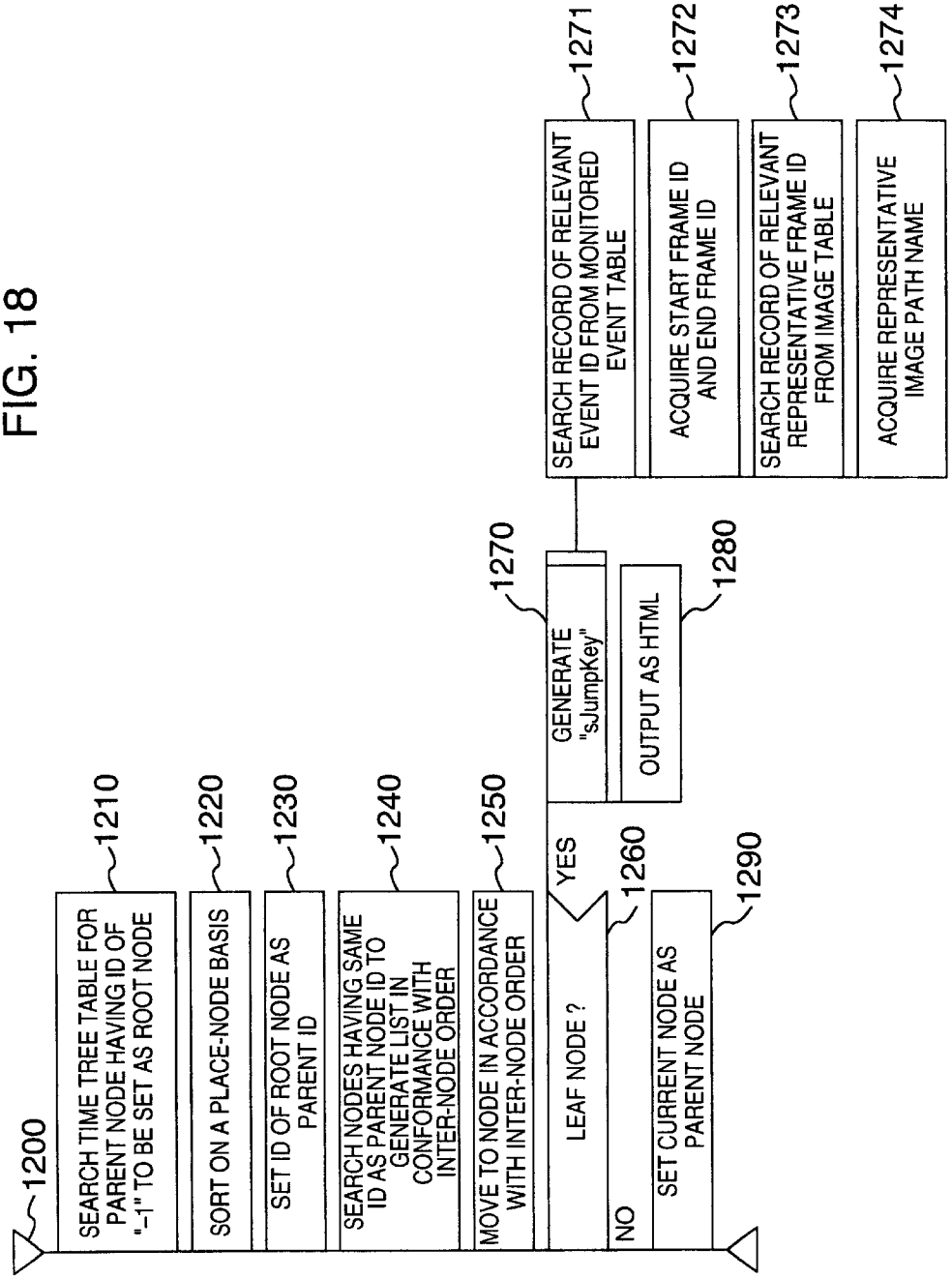
FIG. 18 is a flow chart for illustrating a procedure for generating HTML text data on a list image display screen according to an embodiment of the present invention.

Next, referring to FIG. 18, description will be made of a procedure (generally denoted by reference numeral 1200) for generating HTML text data "Digest" together with a tree display on the assumption that all the data are displayed because of no designation of the range for the list display. In the first place, nodes having as the parent node the root node (i.e., the node for which the record ID contains "−1") of the time tree are searched from all the records in a step 1210. Subsequently, the nodes as searched are sorted with reference to the place identifiers (IDs) 162-4-7, respectively, in a step 1220. Next, the root node is set as the parent node (step 1230). After the parent node having been determined, the nodes having the same parent node identifier (ID) are searched to be sorted in accordance with the inter-node order, for thereby generating a list (step 1240). In succession, for the node list generated in this way, move to all the leaves nodes within the tree structure is repeated recursively (step 1250).

More specifically, it is first checked whether or not the current node is a branch node or a leaf node (step 1260). When the current node is a branch node, then check is made recursively to the node of lower level (step 1290). On the other hand, when the current node is a leaf node, then the parameter "s Jump Key" is generated (step 1270) to be outputted as HTML (step 1280).

A procedure of generating the parameter "s Jump Key" will be described below in concrete. In the first place, record which coincides with the event identifier (ID) 162-4-5 of the node is searched from the event table 162-3 (step 1271), to thereby acquire the start frame identifier (ID) 162-3-2 and the end frame identifier (ID) 162-3-3. Subsequently, record which coincides with the representative frame identifier (ID) 162-3-4 is searched from the image table (step 1273) to thereby acquire the representative image path name as the URL (step 1274). The processings mentioned above are repetitively executed for all the leaves nodes.

Figure 19A:
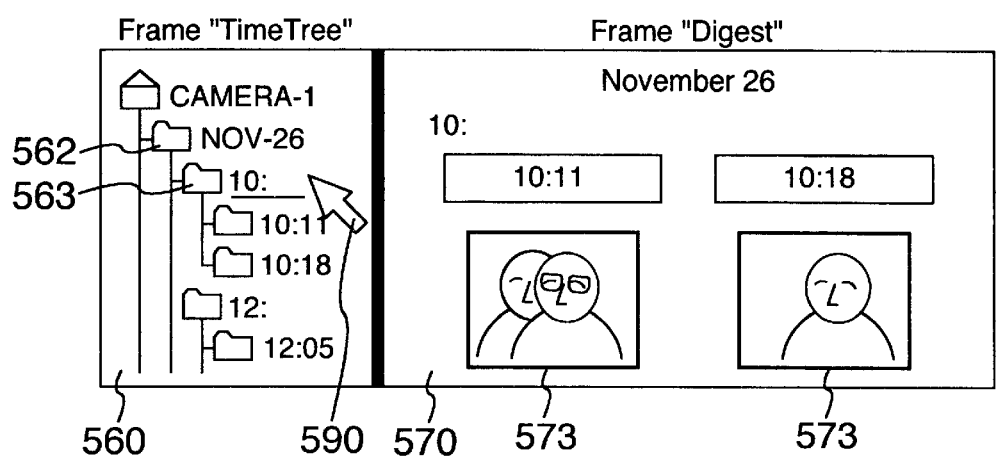

FIGS. 19A and 19B are views for illustrating a method of dynamically changing over the tree display field 560 representing a time tree to the list display field 570. For convenience of the description, the frame name of the tree display field 560 will be referred to as "time tree".

When the node which is not the leaf in the tree display is pointed with the pointing device 190 by the user for changing over the display, then the range for "data/time" is designated in the frame "Digest". From the viewpoint of the internal processing, this corresponds to the case where the parent node is given concretely by the time tree table 162-4. Thereafter, HTML data are dynamically generated through the same procedure as described previously by reference to FIG. 18.

Referring to FIG. 19B, reference numeral 1300 denotes generally an example of HTML for realizing the jump mentioned above. To this end, a <DIV> tag is employed for realizing the tree structure which is opened and closed dynamically. In order to allow the output to be changed over at the destination clicked as in the case of the example of "Anime" described previously, the value of the parameter "s Digest Key" transferred by every hyper-jump tag <A> is changed. As the above-mentioned value, the character string constituted by "place name" +"date/time" is employed as denoted by reference numerals 1310 and 1320. The character string is same as the node search key 162-4-3 in the time tree table 162-4, which in turn means that the structure capable of performing speedily the search for depicting the frame "Digest" can be realized.

Figure 20:
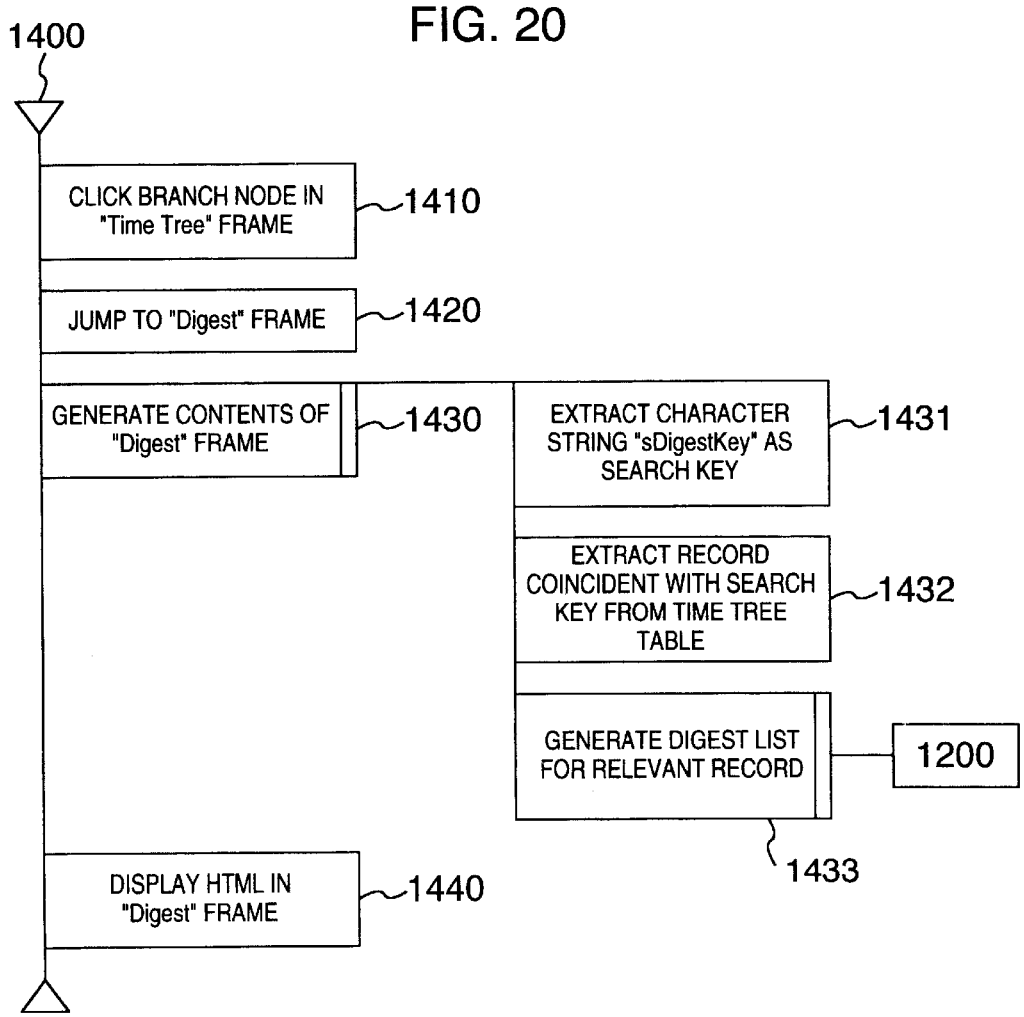
FIG. 20 is a flow chart for illustrating operations activated upon clicking of a branch node in a time tree structure display according to an embodiment of the present invention.

FIG. 20 is a flow chart for illustrating operations activated upon clicking of a branch node in the time tree structure display for the frame "Time Tree".

Referring to the figure, when the branch node is clicked (step 1410), jump event to the frame "Digest" takes place (step 1420). Because HTML indicated by the frame "Digest"

represents dynamic pages, content generation processing is started (step 1430). In more concrete, character string value of "s Digest Key" given as the parameter upon jumping is extracted (step 1431), whereon the coincident record is searched from the time tree table 162-4 by using the above-mentioned value as the search key (step 1432). The node identifier (ID) 162-4-1 of the record detected in this way is set as the parent node, which is then followed by generation of the HTML data for the list display through the same procedure as described previously in conjunction with the HTML test data generating procedure 1200 (step 1433). Finally, the HTML data is displayed on the frame "Digest" in a step 1440.

Many modifications and variations of the present invention are possible in the light of the above techniques. It is therefore to be understood that within the scope of the appended claims, the invention may be practiced otherwise than as specifically described.

What is claimed is:

1. An image recording/playback apparatus for a monitoring system, comprising:
   a first processing unit for converting a monitoring image signal as inputted into a plurality of time-serial digitized monitoring image frames to store said digitized monitoring image frames in a first storage area;
   a second processing unit for extracting from said plurality of digitized monitoring image frames stored in said first storage area a plurality of monitoring image frames relevant to at least one event to be monitored, said second processing unit defining a period for said at least one event to be monitored, based on contents of said plurality of digitized image frames stored in a first storage area, and extracting monitoring image frames from said plurality of digitized monitoring image frames within said period at predetermined fixed sampling intervals to thereby store said extracted monitoring image frames in a second storage area, the at least one event to be monitored being related to positional changes of at least one of persons and equipment;
   a third processing unit for generating a monitored event database having a data structure of separately managing information as to storage addresses of the monitoring image frames stored in said second storage area and information as to said at least one event to which the monitoring image frames belong;
   a fourth processing unit responsive to a user's perusal request designating an element of the data structure of said monitored even database, for searching said database, acquiring storage addresses of monitoring image frames stored in said second storage area and belonging to an event-to-be-monitored corresponding to the user's request, and selecting the image frames belonging to the event-to-be-monitored from said second storage area based on said storage addresses thus acquired; and
   a fifth processing unit for generating an output signal for displaying said selected monitoring image frames belonging to the event-to-be-monitored on a display device in a two-dimensional array or in the form of time-serial animation.

2. An image recording/playback apparatus for a monitoring system according to claim 1,
   wherein said display device is connected to said image recording/playback apparatus via a network,
   wherein said fifth processing unit for generating said output signal includes a web server, and
   wherein in response to a perusal request issued by making use of said web browser by a user viewing display generated on said display device, said web server sends said plural monitoring image frames as selected to said display device as hypertext markup language (HTML) data via said network.

3. An image recording/playback apparatus for a monitoring system according to claim 1, wherein said fifth processing unit for generating said output signal is designed to generate an output signal for displaying a current monitoring image frame to be stored in said first storage area on said display device simultaneously with said plurality of monitoring image frames as selected.

4. An image recording/playback apparatus for a monitoring system according to claim 1,
   further comprising:
      a sixth processing unit for generating an output signal for displaying elements of the data structure of said monitored event database in the form of a tree structural expression in which said elements are disposed in a tree structure.

5. An image recording/playback apparatus for a monitoring system according to claim 1,
   wherein the element for which the perusal request is issued by the user is designated by clicking a graphically represented element in said tree structural expression being displayed on said display device.

6. An image recording/playback apparatus for a monitoring system according to claim 1,
   wherein said second and third storage areas are prepared on an auxiliary storage.

7. An image recording/playback apparatus according to claim 1,
   wherein a first frame image or a last frame image or a frame image located at a mid position between said first and last frame images within a time period during which a concerned event for monitoring is occurring is extracted.

8. An image recording/playback apparatus for a monitoring system, comprising:
   a first processing unit for converting a monitoring image signal as inputted into a plurality of time-serial digitized monitoring image frames to store said digitized monitoring image frames in a first storage area;
   a second processing unit for extracting from said plurality of digitized monitoring image frames stored in said first storage area a plurality of monitoring image frames relevant to at least one event to be monitored, said second processing unit extracting image frames at sampling intervals variable according to control rules previously stored, when said second processing unit detects said at least one event to be monitored from said plurality of digitized monitoring image frames stored in a first storage area, to thereby store said extracted monitoring image frames in a second storage area, the at least one event to be monitored being related to positional changes of at least one of persons and equipment;
   a third processing unit for generating a monitored event database having a data structure of separately managing information as to storage addresses of the monitoring image frames stored in said second storage area and information as to said at least one event to which the monitoring image frames belong;
   a fourth processing unit responsive to a user's perusal request designating an element of the data structure of said monitored event database, for searching said database, acquiring storage addresses of monitoring image frames stored in said second storage area and belonging to an event-to-be-monitored corresponding to the user's request, and selecting the image frames belonging to the event-to-be-monitored from said second storage area based on said storage addresses thus acquired; and a fifth processing unit for generating an output signal for displaying said selected monitoring image frames belonging to the event-to-be-monitored on a display device in a two-dimensional array or in the form of time-serial animation.

9. An image recording/playback apparatus according to claim 8, wherein a frame image at a position where a characteristic quantity representing a concerned event is locally maximum or alternatively locally minimum or alternatively changing at a high rate is extracted.

10. An image recording/playback apparatus according to claim 8, wherein said plurality of monitoring image frames as selected are disposed to be displayed two-dimensionally together with time entries on a time basis such as date, hour, every fifteen minutes and a.m./p.m.

11. An image recording/playback apparatus according to claim 8, wherein a characteristic quantity transition graph indicating history of the concerned event is displayed in association with said selected monitoring image frame.

12. An image recording/playback apparatus according to claim 8, wherein said fifth processing unit for generating said output signal is designed to store the representative images in an image format capable of being displayed in a WEB browser on a frame-by-frame basis and output an HTML tag <IMG SRC="image data storage path name"> as HTML data for displaying said representative image without need for copying/moving the image data internally of a WEB server.

13. An image recording/playback apparatus according to claim 8, wherein said fifth processing unit for generating said output signal is designed to output an HTML tag indicating the representative image or a character string indicating a concerned event as a character string sandwiched between <A HREF="another layout display"? parameter> and <IA> for thereby allowing said representative image or said event to be automatically moved/displayed by clicking said sandwiched character string.

14. An image recording/playback apparatus according to claim 13, wherein said fifth processing unit for generating said output includes means for generating dynamically HTML data of event information and image on the basis of said event information and said image updated every moment.

15. An image recording/playback apparatus for a monitoring system according to claim 8, wherein said display device is connected to said image recording/playback apparatus via a network, wherein said fifth processing unit for generating said output signal includes a WEB server, and wherein in response to a perusal request issued by making use of said WEB browser by a user viewing display generated on said display device, said WEB server sends said plural monitoring image frames as selected to said display device as hypertext markup language (HTML) data via said network.

16. An image recording/playback apparatus for a monitoring system according to claim 8, wherein said fifth processing unit for generating said output signal is designed to generate an output signal for displaying a current monitoring image frame to be stored in said first storage area on said display device simultaneously with said plurality of monitoring image frames as selected.

17. An image recording/playback apparatus for a monitoring system according to claim 8, further comprising:

a sixth processing unit for generating an output signal for displaying elements of the data structure of said monitored event database in the form of a tree structural expression in which said elements are disposed in a tree structure.

18. An image recording/playback apparatus for a monitoring system according to claim 8, wherein the element for which the perusal request is issued by the user is designated by clicking a graphically represented element in said tree structural expression being displayed on said display device.

19. An image recording/playback apparatus for a monitoring system according to claim 8, wherein said second and third storage areas are prepared on an auxiliary storage.

20. A recording medium storing a computer executable program for carrying out an image recording/playback method for a monitoring system, comprising:

a first processing module for converting a monitoring image signal as inputted into a plurality of time-serial digitized monitoring image frames to store said digitized monitoring image frames in a first storage area;

a second processing module for extracting from said plurality of digitized monitoring image frames stored in said first storage area a plurality of monitoring image frames relevant to at least one event to be monitored, said second processing module defining a period for said at least one event to be monitored, based on contents of said plurality of digitized image frames stored in a first storage area, and extracting monitoring image frames from said plurality of digitized monitoring image frames at predetermined fixed sampling intervals within said period to thereby store said extracted monitoring image frames in a second storage area, the at least one event to be monitored being related to positional changes of at least one of persons and equipment;

a third processing module for generating a monitored event database having a data structure of separately managing information as to storage addresses of the monitoring image frames stored in said second storage area and information as to said at least one event to which the monitoring image frames belong;

a fourth processing module responsive to a user's perusal request designating an element of the data structure of said monitored even database, for searching said database, acquiring storage addresses of monitoring image frames stored in said second storage area and belonging to an event-to-be-monitored corresponding to the user's request, and selecting the image frames belonging to the event-to-be-monitored from said second storage area based on said storage addresses thus acquired; and a fifth processing module for generating an output signal for displaying said selected monitoring image frames belonging to the event-to-be-monitored on a display device in a two-dimensional array or in the form of time-serial animation.

21. A recording medium storing a computer executable program for carrying out an image recording/playback method for a monitoring system, comprising:

a first processing module for converting a monitoring image signal as inputted into a plurality of time-serial digitized monitoring image frames to store said digitized monitoring image frames in a first storage area;

a second processing module for extracting from said plurality of digitized monitoring image frames stored in said first storage area a plurality of monitoring image frames relevant to at least one event to be monitored, said second processing module extracting image frames at sampling intervals variable according to control rules previously stored, when said second processing module detects said at least one event to be monitored from said plurality of digitized monitoring image frames stored in a first storage area, to thereby store said extracted monitoring image frames in a second storage area, the at least one event to be monitored being related to positional changes of at least one of persons and equipment;

a third processing module for generating a monitored event database having a data structure of separately managing information as to storage addresses of the monitoring image frames stored in said second storage area and information as to said at least one event to which the monitoring image frames belong;

a fourth processing module responsive to a user's perusal request designating an element of the data structure of said monitored event database, for searching said database, acquiring storage addresses of monitoring image frames stored in said second storage area and belonging to an event-to-be-monitored corresponding to the user's request, and selecting the image frames belonging to the event-to-be-monitored from said second storage area based on said storage addresses thus acquired; and a fifth processing module for generating an output signal for displaying said selected monitoring image frames belonging to the event-to-be-monitored on a display device in a two-dimensional array or in the form of time-serial animation.

* * * * *